United States Patent
Lockhart et al.

(10) Patent No.: US 12,078,860 B2
(45) Date of Patent: Sep. 3, 2024

(54) FIBER OPTIC SPOOL ARRANGEMENT; AND METHOD

(71) Applicant: COMMSCOPE TECHNOLOGIES LLC, Hickory, NC (US)

(72) Inventors: Paula Lockhart, New Prague, MN (US); Michael J. Schomisch, Rosemount, MN (US); Thomas Marcouiller, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 325 days.

(21) Appl. No.: 17/603,224

(22) PCT Filed: Apr. 9, 2020

(86) PCT No.: PCT/US2020/027451
§ 371 (c)(1),
(2) Date: Oct. 12, 2021

(87) PCT Pub. No.: WO2020/210479
PCT Pub. Date: Oct. 15, 2020

(65) Prior Publication Data
US 2022/0187558 A1      Jun. 16, 2022

Related U.S. Application Data

(60) Provisional application No. 62/833,257, filed on Apr. 12, 2019.

(51) Int. Cl.
*G02B 6/44* (2006.01)
*B65H 75/14* (2006.01)

(52) U.S. Cl.
CPC .......... *G02B 6/4457* (2013.01); *B65H 75/14* (2013.01); *B65H 2701/32* (2013.01); *B65H 2701/533* (2013.01)

(58) Field of Classification Search
CPC .. G02B 6/4457; B65H 75/14; B65H 2701/32; B65H 2701/533
See application file for complete search history.

(56) References Cited

U.S. PATENT DOCUMENTS 4,913,369 A * 4/1990 Lia ..................... G02B 23/2476
  242/129
5,317,663 A    5/1994 Beard et al.
(Continued)

FOREIGN PATENT DOCUMENTS

| | | |
|---|---|---|
| JP | H07-085737 A | 3/1995 |
| WO | 2015/086043 A1 | 6/2015 |
| WO | 2019/169148 A1 | 9/2019 |

OTHER PUBLICATIONS

International Search Report and Written Opinion of the International Searching Authority for International Patent Application No. PCT/US2020/027451 mailed Jul. 29, 2020, 13 pages.

*Primary Examiner* — Peter Radkowski
(74) *Attorney, Agent, or Firm* — Merchant & Gould P.C.

(57) ABSTRACT

A fiber optic cable spool is disclosed herein. The fiber optic cable spool may include a first radial flange located at a first axial end of the fiber optic cable spool, a second radial flange located at a second axial end of the fiber optic cable spool, and a drum that extends axially between the first and second radial flanges. The fiber optic cable spool may also include a storage compartment located within the drum. The first radial flange may define a first opening for accessing the storage compartment within the drum. The drum may have a circumferential drum surface that defines a second opening for accessing the storage compartment within the drum.

16 Claims, 15 Drawing Sheets

(56) References Cited

U.S. PATENT DOCUMENTS

| | | | |
|---|---|---|---|
| 5,335,874 A | | 8/1994 | Shrum et al. |
| 5,791,590 A | * | 8/1998 | Zuk ................... B65H 75/229 |
| | | | 242/610.6 |
| 7,874,411 B2 | | 1/2011 | Roberts et al. |
| 8,254,740 B2 | | 8/2012 | Smith et al. |
| 9,494,757 B2 | * | 11/2016 | Schomisch .......... G02B 6/4452 |
| 9,563,031 B2 | | 2/2017 | Loeffelholz et al. |
| 9,581,780 B2 | | 2/2017 | Kowalczyk et al. |
| 9,791,655 B2 | * | 10/2017 | Schomisch .......... G02B 6/3897 |
| 10,078,193 B2 | * | 9/2018 | Schomisch .......... G02B 6/4471 |
| 10,663,685 B2 | * | 5/2020 | Schomisch .......... G02B 6/4471 |
| 2008/0093187 A1 | | 4/2008 | Roberts et al. |
| 2015/0043882 A1 | * | 2/2015 | Schomisch .......... G02B 6/4457 |
| | | | 29/428 |
| 2016/0223771 A1 | | 8/2016 | Kowalczyk et al. |
| 2017/0031124 A1 | * | 2/2017 | Schomisch .......... G02B 6/3897 |
| 2017/0199344 A1 | | 7/2017 | Kowalczyk et al. |
| 2017/0235079 A1 | | 8/2017 | Kowalczyk et al. |
| 2017/0343758 A1 | * | 11/2017 | Schomisch .......... G02B 6/4452 |
| 2019/0064466 A1 | * | 2/2019 | Schomisch .......... G02B 6/4452 |

\* cited by examiner

FIBER OPTIC SPOOL ARRANGEMENT; AND METHOD

CROSS-REFERENCE TO RELATED APPLICATION

This application is a National Stage Application of PCT/US2020/027451, filed on Apr. 9, 2020, which claims the benefit of U.S. Patent Application Ser. No. 62/833,257, filed on Apr. 12, 2019, the disclosures of which are incorporated herein by reference in their entireties. To the extent appropriate, a claim of priority is made to each of the above disclosed applications.

TECHNICAL FIELD

The present disclosure relates generally to fiber optic assemblies. More specifically, the present disclosure relates to a fiber optic spool arrangement and method for deploying, housing, storing, shipping, and managing telecommunications cable.

BACKGROUND

Telecommunication cabling systems may include cabinets that house terminations and connections/interconnections of telecommunication cables. The telecommunication cables can include electrical cable, fiber optic cable, and/or hybrid cable that includes both electrical and optical conductors. The cabinets may allow terminations of the various cables to be connected, disconnected, and/or reconnected to other terminations of the various cables. In this way, the routing of signals across a telecommunications network can be configured and reconfigured as desired. For example, a trunk cable from a main office of a telecommunications provider or a data center may be branched to various branch cables at the cabinet. Each of the branch cables may then be routed to an end-user or to another cabinet.

The telecommunications cable can be stored on, delivered on, and deployed by spools. The cable may be wound on the spool at a factory that produced the cable. Upon delivery to an installation site, the cable can be unwound from the spool and deployed. The cabinet can hold terminations/connectors of the cables that are routed to it.

SUMMARY

An aspect of the present disclosure relates to a fiber optic cable spool. The fiber optic cable spool may include a first radial flange located at a first axial end of the fiber optic cable spool, a second radial flange located at a second axial end of the fiber optic cable spool, and a drum that extends axially between the first and second radial flanges. The fiber optic cable spool may also include a storage compartment located within the drum. The first radial flange may define a first opening for accessing the storage compartment within the drum. The drum may have a circumferential drum surface that defines a second opening for accessing the storage compartment within the drum.

Another aspect of the present disclosure relates to a cable spool assembly for packaging a telecommunications assembly for storage or shipment. The cable spool assembly may include a first radial flange that defines a first axial end, an opposite, second radial flange that defines a second axial end, and a drum that extends axially between the first and second radial flanges. The first and second radial flanges may each define an outer annular rim that projects radially outwardly from the drum.

The cable spool assembly may also include a storage compartment located within the drum. The storage compartment may be accessible through a first access opening defined by at least the first radial flange, and a circumferential drum surface of the drum may define a second access opening for accessing the storage compartment within the drum.

The cable spool assembly may include a packaging assembly for holding a plurality of telecommunications modules that can be removably positioned within the storage compartment.

A fiber distribution optic cable may be coiled about the circumferential drum surface and contained axially between the first and second radial flanges. The fiber distribution optic cable may be payable and removable from the drum. The fiber distribution optic cable may have an end that is secured to the packaging assembly.

The cable spool assembly may include a mounting system. In one example, the mounting system may include a support member for supporting the fiber optic cable spool. In one example, the support member may include a pallet-like structure.

The mounting system may also include first and second rotatable rollers located on the pallet-like structure. The first and second rotatable rollers may be positioned to support the first and second radial flanges of the fiber optic cable spool at ninety degrees relative to the pallet-like structure.

The cable spool assembly may be adapted to rotate about a central spool axis when the fiber distribution optic cable is dispensed from the cable spool assembly. In certain examples, the central spool axis may be horizontally aligned.

Another aspect of the present disclosure relates to a method of packaging a cable spool. The method may include steps of: 1) providing a spool that has a first radial flange that defines a first axial end, an opposite, second radial flange that defines a second axial end, and a drum that extends axially between the first and second radial flanges, the first radial flange may define a first access opening, the drum may have a circumferential drum surface that defines a second access opening, the drum may have a storage compartment located between the first and second axial ends; 2) placing a first end portion of a fiber distribution optic cable within the storage compartment through the second access opening; and 3) wrapping a second end portion of the fiber distribution optic cable around the circumferential drum surface of the spool such that the second access opening is closed off by the fiber distribution optic cable.

Another aspect of the present disclosure relates to a method of packaging a cable spool for storage or shipping of telecommunications equipment with connection locations. The method may include steps of: 1) providing a spool that has a first radial flange that defines a first axial end, an opposite, second radial flange that defines a second axial end, and a drum that extends axially between the first and second radial flanges, the first radial flange may define a first access opening, the drum may have a circumferential drum surface that defines a second access opening, the drum has a storage compartment located between the first and second axial ends, a fiber distribution optic cable may be coiled about the drum where a first end portion of the fiber distribution optic cable may be placed inside the storage compartment and where a second end portion of the fiber distribution optic cable may be wrapped around the drum such that the second access opening is closed off by the fiber distribution optic cable; 2) removing a third radial flange from the spool to expose the first access opening; 3) accessing the storage compartment through the first access opening to pull out the first end portion of the fiber distribution optic cable; 4) attaching a telecommunications equipment to the fiber distribution optic cable at the first end portion thereof; 5) inserting the telecommunications equipment and the first end portion of the fiber distribution optic cable into the storage compartment through the first accessing opening of the first radial flange; and 6) mounting the third radial flange back onto the spool to close off the first access opening.

Another aspect of the present disclosure relates to method of deploying a packaged cable spool assembly with stored telecommunications equipment. The method may include steps of: 1) providing a cable spool assembly that includes a spool, the spool may include a first radial flange that defines a first axial end, an opposite, second radial flange that defines a second axial end, and a drum that extends axially between the first and second radial flanges, the first radial flange may define a first access opening, the drum may have a circumferential drum surface that defines a second access opening, the drum has a storage compartment located between the first and second axial ends, a fiber distribution optic cable may be coiled about the drum, a telecommunication equipment may be attached to a first end portion of the fiber distribution optic cable, the telecommunications equipment and the first end portion of the fiber distribution optic cable may be stored inside the storage compartment, and a second end portion of the fiber distribution optic cable may be wrapped around the drum such that the second access opening may be closed off by the fiber distribution optic cable; 2) mounting the spool onto a mounting system such that the first and second radial flanges are positioned vertically on the mounting system; 3) moving the spool while mounted on the mounting system to a desired location; 4) grabbing the second end portion of the fiber distribution optic cable; 5) unwinding the fiber distribution optic cable from the drum of the spool to expose the second access opening; 6) grabbing the telecommunications equipment stored within the storage compartment; 7) pulling the telecommunications equipment out of the storage compartment through the second access opening; and 8) mounting the telecommunications equipment to a telecommunications rack.

A further aspect of the present disclosure relates to cable spool assembly for packaging a telecommunications assembly for storage or shipment. The cable spool assembly may include a first radial flange that defines a first axial end and an opposite, second radial flange that defines a second axial end. The cable spool assembly may include a drum that extends axially between the first and second radial flanges. The drum may have a circumferential drum surface. The first and second radial flanges can each define an outer annular rim that projects radially outwardly from the drum. The cable spool assembly may include a storage compartment located within the drum. The storage compartment may be accessible through a first access opening defined by at least the first radial flange. The circumferential drum surface of the drum defines a second access opening for accessing the storage compartment within the drum. The cable spool assembly may include a packaging assembly for holding a plurality of telecommunications modules that can be removably positioned within the storage compartment. The cable spool assembly may have a fiber distribution optic cable coiled about the circumferential drum surface and contained axially between the first and second radial flanges. The fiber distribution optic cable may be payable and removable from the drum. The fiber distribution optic cable may have an end that is secured to the packaging assembly. The cable spool assembly can further include a mounting system for supporting the first and second radial flanges. The mounting system can include a support member. The cable spool assembly rotates about a central spool axis when the fiber distribution optic cable is dispensed from the cable spool assembly. The central spool axis can be horizontally aligned.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure relates, generally relates to spools or reels and particularly to spools for storing and for shipping cables, and is especially concerned with an assembled telecommunications equipment stored within the spool in which numerous novel and advantageous structural and functional features are incorporated.

A spool or reel structure designed in the past for the purpose of storing and of shipping cables usually include a central barrel body provided with two lateral flanges to wound cable thereabout. A length of cable can be wrapped around the spool, the spool can be taken to an equipment room where the cable is unwound to allow telecommunications equipment to be added and the cable is wrapped once again about the spool. It can be time consuming to initially wrap the cable just to unwrap the cable to access a free end to terminate with telecommunications equipment and once again wrap the spool with a desired length of cabling. This method of storing and of shipping cables has numerous disadvantages resulting from the construction of the spool outlined above.

The present disclosure relates to a fiber optic cable spool which avoids the above disadvantages. Generally, the improved fiber optic cable spool includes dual openings that allow a desired amount of cabling to be wrapped about the fiber optic cable spool only once. The improved fiber optic cable spool also provides access to a free end of the cable to terminate telecommunications equipment thereto where the telecommunications equipment can be stored and shipped within the spool and be accessible through the dual openings.

The present disclosure also relates to a mounting system that supports the fiber optic cable spool in an orientation that allows the cabling to be deployed traversely. The mounting system allows the fiber optic cable spool to be transported to a deployment area without any concern for its width. The fiber optic cable spool can have any length of cabling coiled thereon to provide as large a radius as desired which can result in a fiber optic cable spool that can be as tall as needed. The fiber optic cable spool can be mounted upright on the mounting system to allow the mounting system to fit through narrow openings at some deployment areas. That is, the customer can move the product to the designated deployment area without any concern for the mounting system width size.

Figure 1:
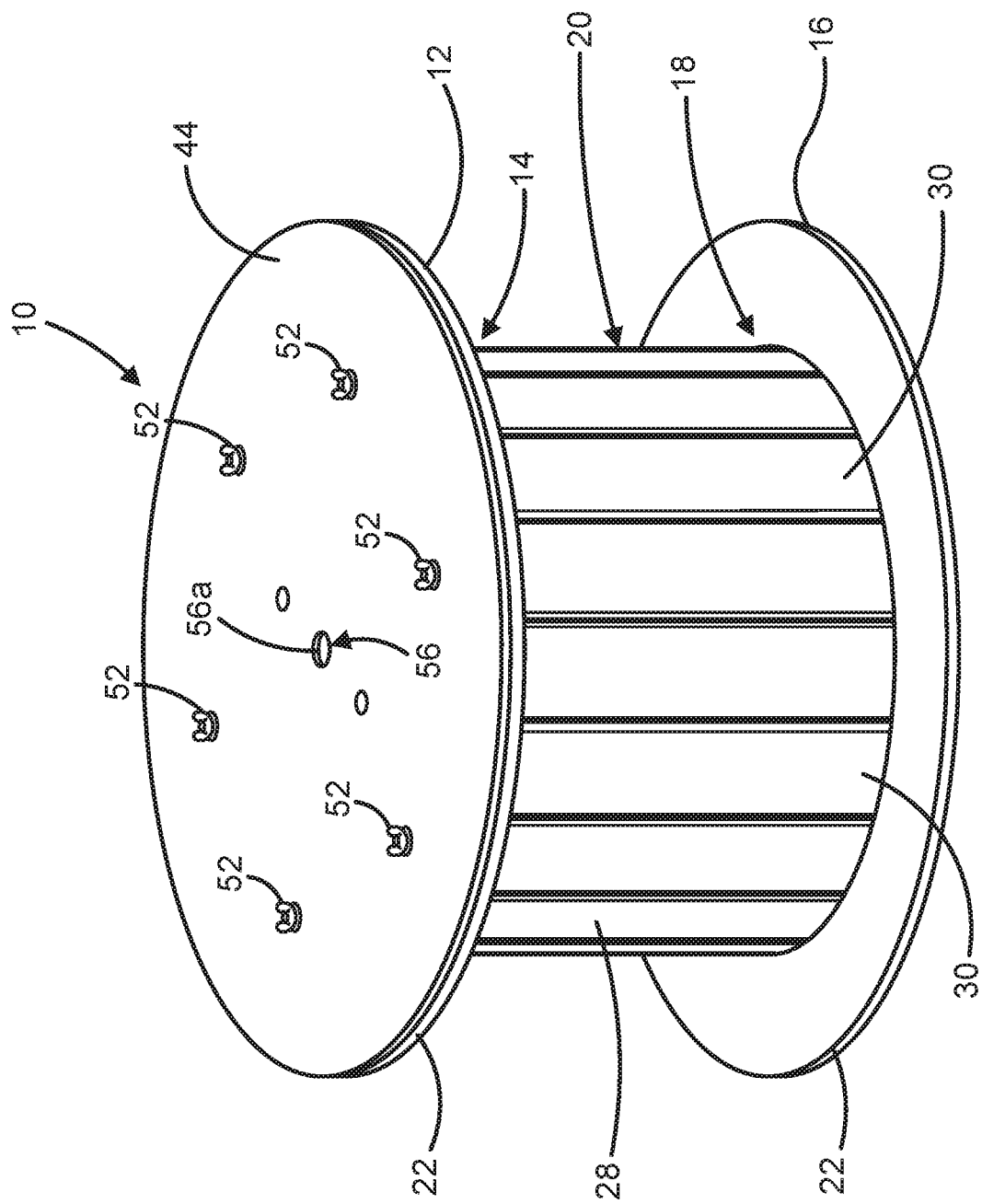
FIG. 1 is a perspective view of a fiber optic cable spool in accordance with principles of the present disclosure.
Figure 2:
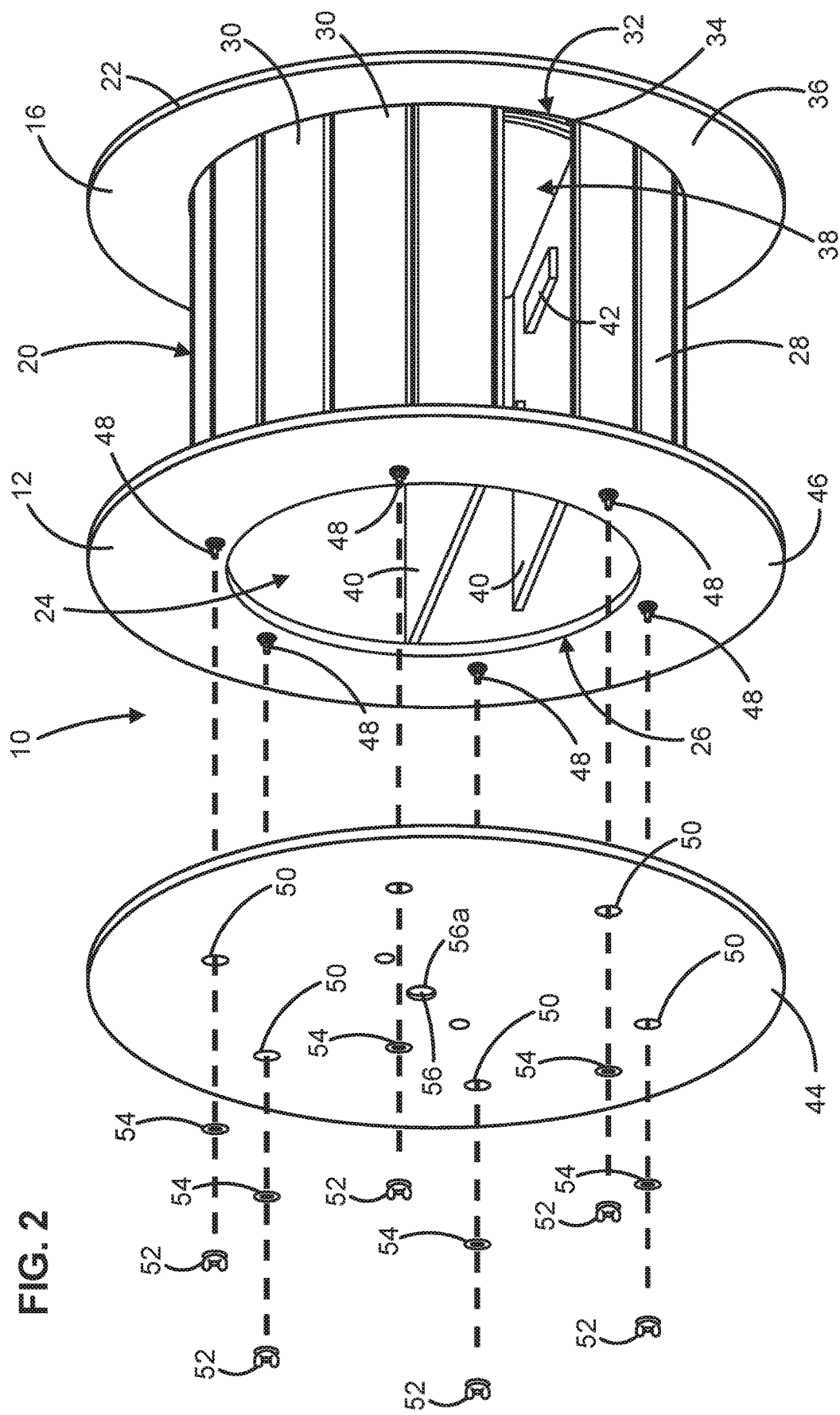
FIG. 2 is a perspective view of the fiber optic cable spool of FIG. 1 having a cover lid exploded therefrom and first and second openings to access a storage compartment therein.

Referring to FIGS. 1-2, an example fiber optic cable spool 10 (e.g., reel), is depicted. The fiber optic cable spool 10 may include a first radial flange 12 (e.g., front radial flange, top radial flange) located at a first axial end 14 of the fiber optic cable spool 10, a second radial flange 16 (e.g., rear radial flange, bottom radial flange) located at a second axial end 18 of the fiber optic cable spool 10, and a drum 20 (e.g., tubular cylindrical drum, cable storage space, cable management recess) that extends axially between the first and second radial flanges 12, 16. In certain examples, the first radial flange 12 defines the first axial end 14 and the second radial flange 16 defines the second axial end 18. The first and second radial flanges 12, 16 may each define an outer annular rim 22 that projects radially outwardly from the drum 20.

The fiber optic cable spool 10, including the drum 20 and/or first and second radial flanges 12, 16, can be manufactured of a plastic material, a paper board material (e.g., cardboard or like material), wood, or a recycled material. In one embodiment, the fiber optic cable spool 10 may be recyclable or disposable after use. The drum 20 may be sized such that it includes a curvature that is larger than the minimum bend radius of the cabling so as to avoid attenuation damage to optical fibers during storage. Thus, even though the drum 20 and the first and second radial flanges 12, 16 have been depicted as including generally cylindrical shapes, other shapes can be used as long as the minimum bend radius requirements for the optical fibers are met. The shapes of the first and second radial flanges 12, 16 do not depend upon bend radius requirements.

The fiber optic cable spool 10 may include a storage compartment 24 (e.g., interior region, inner cavity, pocket) located within the drum 20 between the first and second radial flanges 12, 16. That is, the storage compartment 24 may extend between the first and second axial ends 14, 18 of the fiber optic cable spool 10.

In certain examples, the first radial flange 12 may define a first opening 26 (e.g., first access opening) for accessing the storage compartment 24 within the drum 20. In certain examples, the second radial flange 16 may define the first opening 26. In certain examples, the first and second radial flanges 12, 16 may each define first openings 26.

The drum 20 may include a circumferential drum surface 28 (e.g., outer surface). In certain examples, the circumferential drum surface 28 may include a plurality of panels 30 (e.g., doors, sections, plates, segments, pieces) that can be connected together, although alternatives are possible. The plurality of panels 30 may include ends 32 that are respectively received in a circumferential recess 34 (e.g., slots) defined in inner surfaces 36 of the first and second radial flanges 12, 16, respectively. That is, a length of the plurality of panels 30 is such that the ends 32 do not project beyond the first and second radial flanges 12, 16. In certain examples, the circumferential drum surface 28 may include a continuous cylindrical layer.

The circumferential drum surface 28 of the drum 20 may define a second opening 38 (e.g., second access opening) for accessing the storage compartment 24 within the drum 20. The second opening 38 may be a traverse opening in the drum 20 of the fiber optic cable spool 10.

In certain examples, the second opening 38 may be provided by removing one of the plurality of panels 30. In certain examples, the second opening 38 may be provided by a cutout in the circumferential drum surface 28. In certain examples, the second opening 38 is generally rectangular in shape, although alternatives are possible. The second opening 38 may extend from the first axial end 14 to the second axil end 18 of the fiber optic cable spool 10.

The storage compartment 24 may include a mounting plate 40 (e.g., platform, board, pane, panel) arranged and configured therein to hold telecommunications components stored within the drum 20. In the example depicted, there are two mounting plates 40 generally positioned parallel to each other, although alternatives are possible. The mounting plate 40 may be a rigid member, capable of being handled without resilient "give" or instability. In certain examples, a length of the mounting plates 40 may be defined between first and second radial flanges 12, 16 of the fiber optic cable spool 10 and a width of the mounting plates 40 may be defined between inner sidewalls of the drum 20.

At least one of the mounting plates 40 shown may include support members 42 (e.g., retention members) to help secure and protect telecommunications equipment during shipment and/or storage. That is, the support members 42 may help to prevent the telecommunications equipment from moving or sliding within the drum 20. In certain examples, the support members 42 may be attached (e.g., screwed, bolted, riveted, welded, bonded, etc.) to the mounting plate 40. In certain examples, the support members 42 may be provided as bend radius protectors for fiber optic cable coiled on the mounting plate 40.

The fiber optic cable spool 10 may further include a third radial flange 44 (e.g., lid, cover). In certain examples, the third radial flange 44 may be arranged and configured to mount to and axially overlap one of the first and second radial flanges 12, 16. In certain examples, the fiber optic cable spool 10 may include radial flanges that mount to both first and second radial flanges 12, 16.

In the example depicted in FIG. 2, the third radial flange 44 is attached to the first radial flange 12. When the third radial flange 44 is attached to the first radial flange 12, the first opening 26 is closed off. The third radial flange 44 may have the same outer diameter as the first and second radial flanges 12, 16, although alternatives are possible.

In certain examples, the third radial flange 44 may be a removable piece or may be connected to the fiber optic cable spool 10 with a pivotable hinge structure such as a living hinge.

The first radial flange 12 may include an outer surface 46 opposite the inner surface 36. In certain examples, the outer surface 46 of the first radial flange 12 may include mechanical fasteners 48 (e.g., screws, bolts, etc.) that can be positioned circumferentially thereon and about the first opening 26 to fix the third radial flange 44 onto the first radial flange 12. In certain examples, the mechanical fasteners 48 may be welded to the outer surface 46 of the first radial flange 12, although alternatives are possible. The mechanical fasteners 48 may be received in corresponding openings 50 (e.g., holes, apertures) defined in the third radial flange 44. The mechanical fasteners 48 may be aligned with the openings 50 to mount the third radial flange 44 to the first radial flange 12. The mechanical fasteners 48 may be received in holes of nuts 52 and washers 54 to draw the third radial flange 44 to the first radial flange 12 tightly together in abutting relationship to be secured thereon by turning the nuts 52 on the mechanical fasteners 48.

In certain examples, a central passage 56 (e.g., axial throughhole) may extend axially through the fiber optic cable spool 10. The central passage 56 may be formed by a first opening 56a that extends coaxially through the third radial flange 44 and a second opening (not shown) that extends through the second radial flange 16 in coaxial alignment with the first opening 56a. The central passage 56 may extend generally along a central longitudinal axis A (e.g., central spool axis) of the fiber optic cable spool 10. The central passage 56 may be configured such that a rod can be inserted therethrough to facilitate rotation of the fiber optic cable spool 10 during deployment of cabling. It will be appreciated that the rod may be supported on a cart, frame, pallet, or other structure so that the fiber optic cable spool 10 is elevated above the ground.

Figure 3:
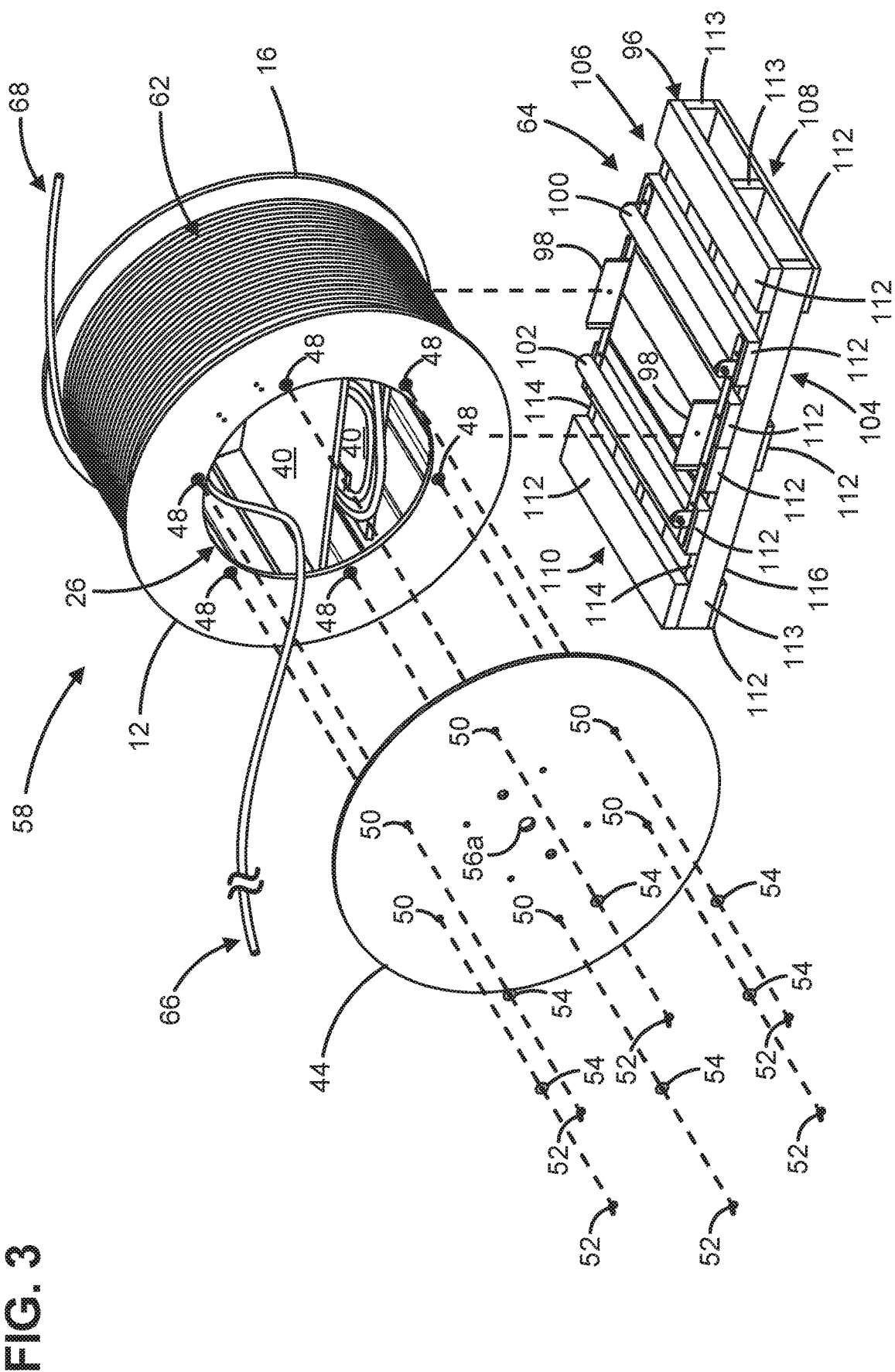
FIG. 3 is a perspective view of a cable spool assembly including the fiber optic cable spool of FIG. 2 and a mounting system in accordance with the principles of the present disclosure.

Turning to FIG. 3, a cable spool assembly 58 is shown that can be used for packaging, storing, and/or shipping telecommunications equipment. The cable spool assembly 58 may include the fiber optic cable spool 10 of FIGS. 1-2, a packaging assembly 60 (see FIG. 4), a fiber distribution optic cable 62, and a mounting system 64.

The fiber optic cable spool 10 may include the fiber distribution optic cable 62 arranged in a coil around the circumferential drum surface 28 of the drum 20 such that the fiber distribution optic cable 62 is contained between the first and second radial flanges 12, 16.

The fiber distribution optic cable 62 may include a first end portion 66 (e.g., leading end, equipment end) and a second end portion 68 (e.g., trailing end, splicing end). The first end portion 66 of the fiber distribution optic cable 62 may be routed through the second opening 38 of the drum 20 to store a length of the fiber distribution optic cable 62 within the storage compartment 24. The first end portion 66 may be accessible through the first opening 26 for processing. The second end portion 68 of the fiber distribution optic cable 62 may include an outer wrap of the coiled cable coming off of the drum 20 which has a bare end.

In one example, the first end portion 66 may include at least about 30 feet of the fiber distribution optic cable 62 that may be placed and stored in the storage compartment 24. In certain examples, at least about 50 feet of the fiber distribution optic cable 62 may be housed in the storage compartment 24. In certain examples, the first end portion 66 may include between about 20 feet to about 60 feet of the fiber distribution optic cable 62 in the storage compartment 24. The first end portion 66 of the fiber distribution optic cable 62 may be pulled out of the storage compartment 24 through the first opening 26.

The fiber distribution optic cable 62 may be wrapped or coiled about the support members 42 on the mounting plate 40 within the storage compartment 24, although alternatives are possible. In certain examples, the fiber distribution optic cable 62 may not be positioned on the mounting plate 40 but simply shoved into the interior region of the drum 20.

The cable spool assembly 58 is preferably adapted to hold a relatively large amount of cable. A predetermined length of the fiber distribution optic cable 62 may be wrapped about the drum 20 of the fiber optic cable spool 10 such that the fiber distribution optic cable 62 closes off the second opening 38.

According to the present disclosure, the term "predetermined length of fiber optic cable" that is stored on the drum 20 may mean an installation length, which is sufficiently long enough to extend from a mounting location of the telecommunications equipment to the customer. The telecommunications equipment may be carried away by an installer to an equipment area, telecommunications rack or housing.

In other examples, a length of the cabling may remain after the predetermined length has been deployed from the drum 20 and may be referred to as an excess length. Thus, the excess length may be the length of cable remaining after the installation length has been unwound from the drum 20. Some of the excess length may also be contained within the storage compartment 24 of the drum 20.

In one example, the fiber optic cable spool 10 of the cable spool assembly 58 holds about 100 feet of distribution cable. In certain examples, the fiber optic cable spool 10 of the cable spool assembly 58 may be sized to hold about 200 feet of distribution cable. In other examples, the fiber optic cable spool 10 may be sized to hold at least 300 feet of diameter cable. In still other examples, the fiber optic cable spool 10 may be sized to hold at least 400 feet of distribution cable. In certain examples, the fiber optic cable spool 10 may be configured to hold at least 500 feet of distribution cable. In additional examples, the fiber optic cable spool 10 may be configured to hold at least 600 feet of distribution cable. In one example, the fiber optic cable spool 10 may be configured to hold from about 100 feet to about 1500 feet of distribution cable, although alternatives are possible.

An advantageous feature of the present disclosure is that the radius of the fiber optic cable spool 10 may be configured as large as desired. This is advantageous in situations where the fiber optic cable spool 10 is not limited by its width but can still be transported through doorways, hallways, etc. with a radius of any size utilizing the mounting system 64.

That is, it does not matter how much cable is coiled about the drum 20 because the radius may be any size and still not be limited by the width of the fiber optic cable spool 10. As such, the fiber optic cable spool 10 may be moved about without hindrance irrespective of how large the radius becomes of the fiber optic cable spool 10. The mounting system 64 will be described in more detail with reference to FIGS. 11-16.

Figure 4:
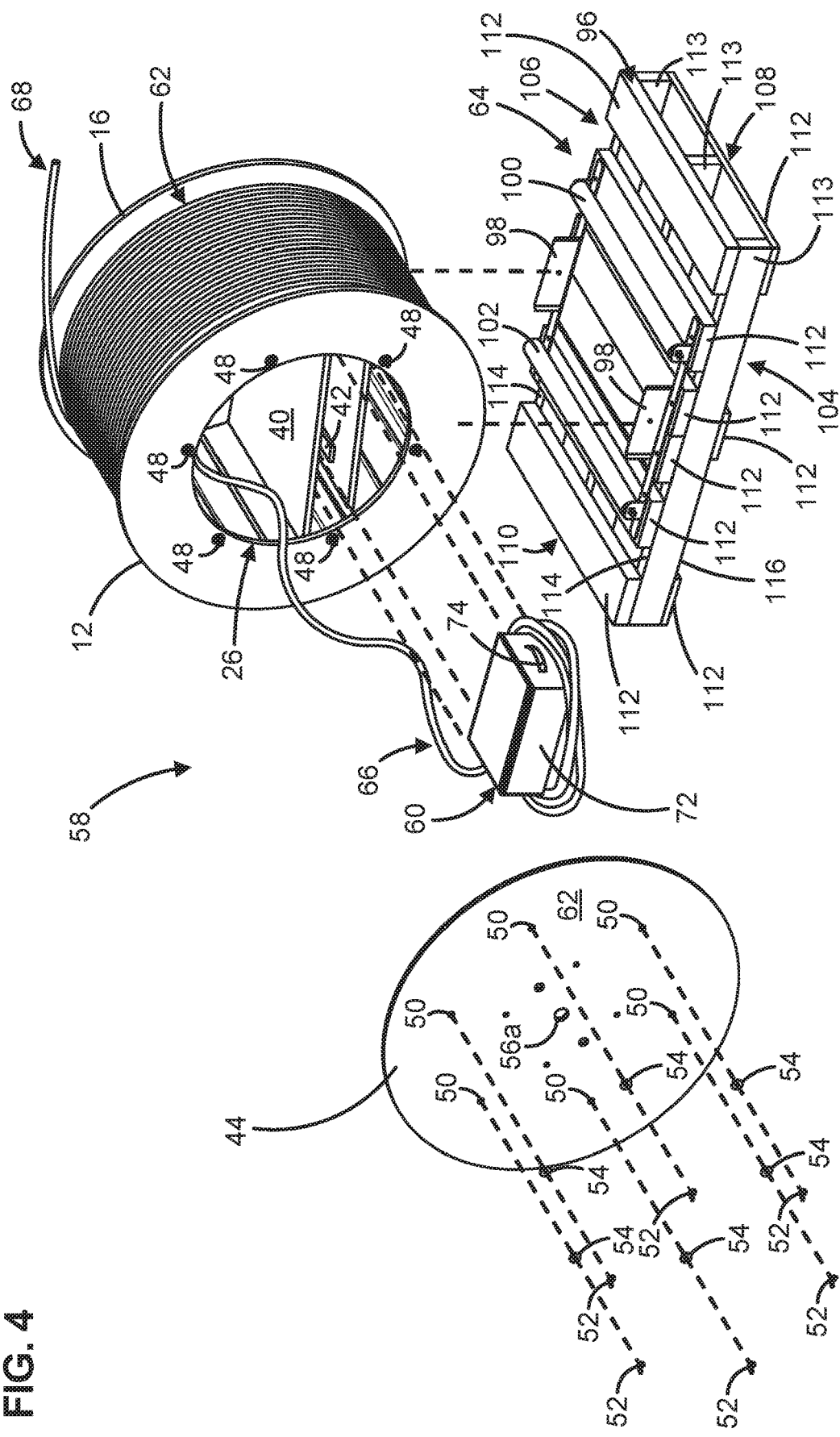
FIG. 4 is a perspective view of the cable spool assembly of FIG. 3 with a first end of a cable attached to equipment and a second end of the cable wrapped about the fiber optic cable spool.

Turning to FIG. 4, the first end portion 66 of the fiber distribution optic cable 62 may be configured as an equipment end accessible through the first opening 26. The fiber optic cable spool 10 may be adapted to allow the telecommunications equipment/product to be assembled from the storage compartment 24 of the drum 20 and be stored prior to deployment of the fiber distribution optic cable 62 from the drum 20. An example product may be a fiber optic module which may be assembled to the first end portion 66 of the fiber distribution optic cable 62, although alternatives are possible.

The first end portion 66 of the fiber distribution optic cable 62 may be preferably accessible to the user or installer of the telecommunications equipment without removing the cabling wound on the drum 20. In some examples, the first end portion 66 of the fiber distribution optic cable 62 may be preferably accessible by the user or operator by first removing the third radial flange 44 to allow access through the first opening 26. That is, once the third radial flange 44 is removed, the first end portion 66 of the fiber distribution optic cable 62 may be routed out of the first opening 26 to the packaging assembly 60. Thus, the fiber distribution optic cable 62 may have an end that is secured to the packaging assembly 60.

The packaging assembly 60 may include telecommunications equipment 70 (see FIG. 6) and a container 72 (e.g., outer housing) for holding the telecommunications equipment 70. The container 72 may include a handle 74 at an opposite end from an opening 76 (see FIG. 5) for carrying the packaging assembly 60.

Figure 5:
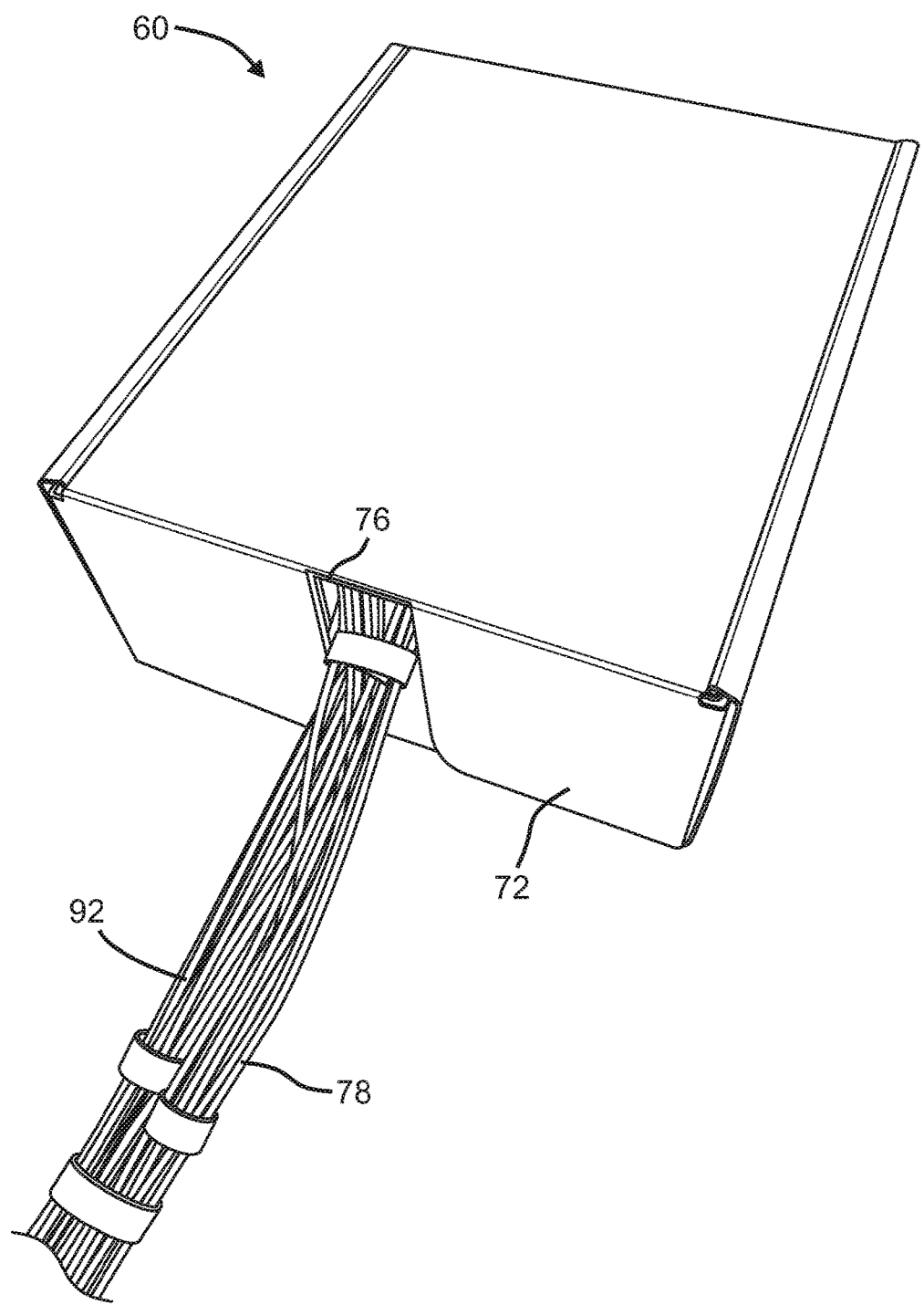
FIG. 5 is a rear perspective view of a packaging assembly in accordance with the principles of the present disclosure illustrating an opening thereof for guiding cabling out of the packaging assembly.
Figure 6:
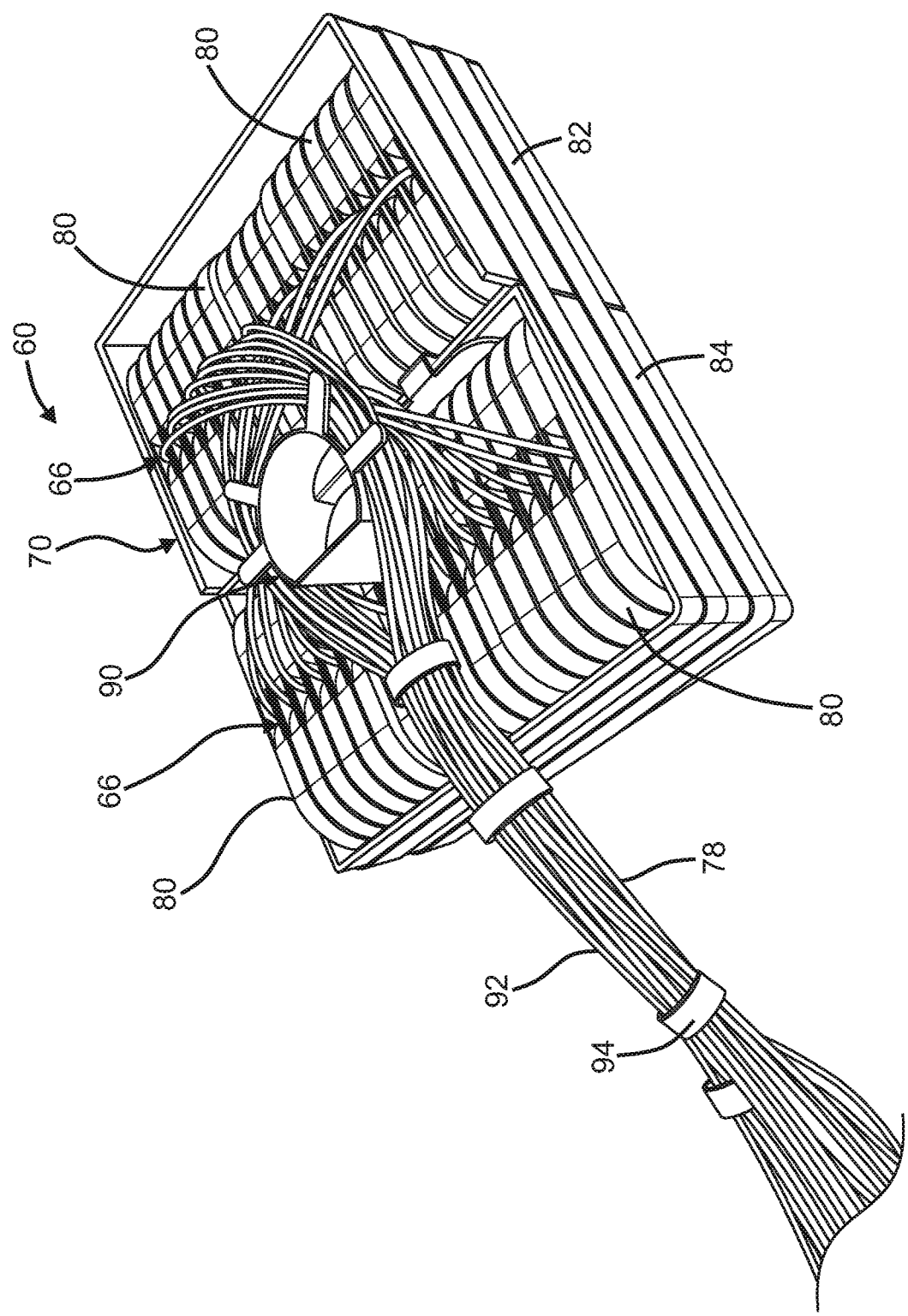
FIG. 6 is a side perspective view a plurality of modules mounted in the packaging assembly of FIG. 5.
Figure 7:
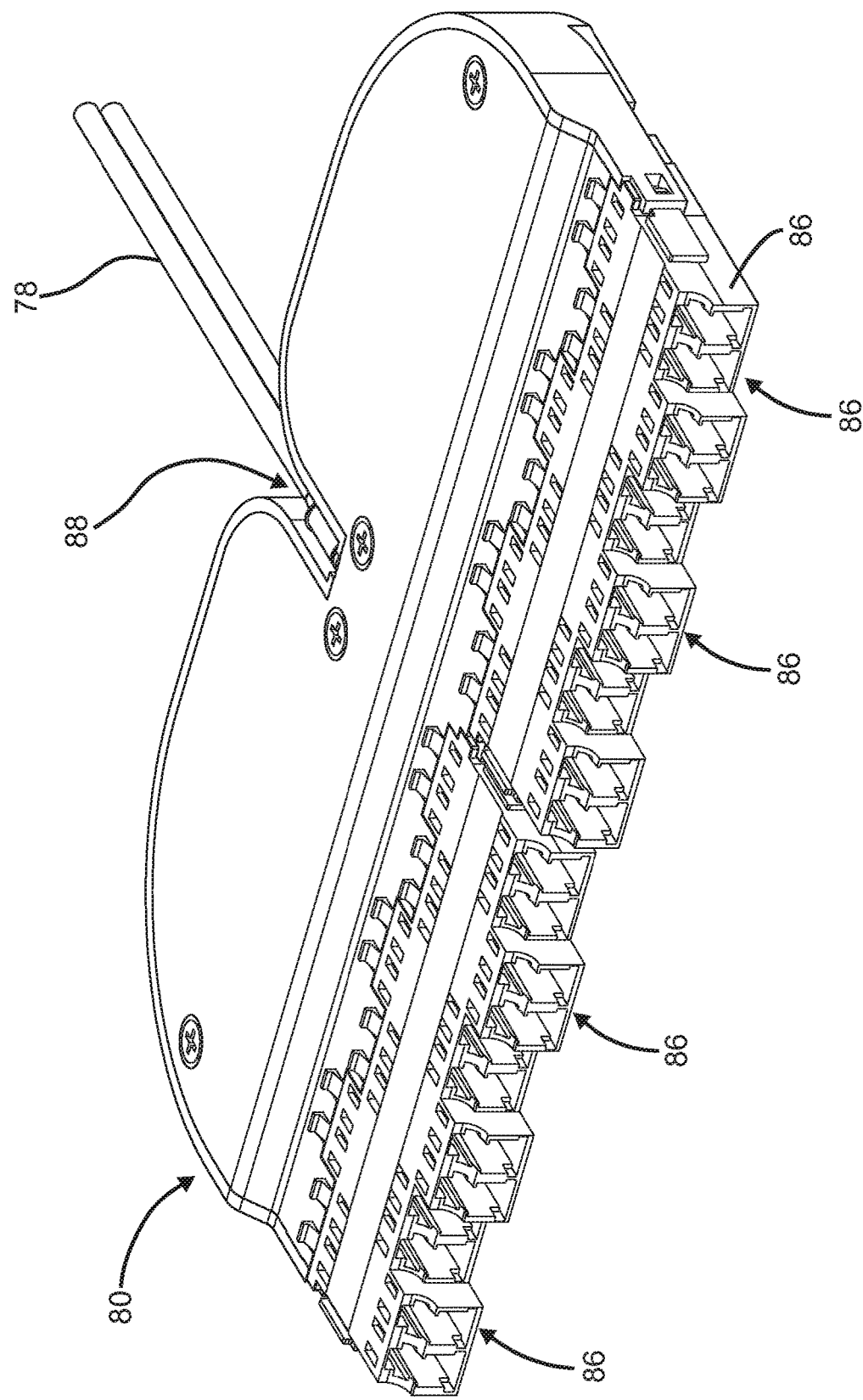
FIG. 7 is a top front perspective view of an example telecommunications module having features similar to those used in the packaging assembly of FIG. 6.

Referring to FIGS. 5-7, in certain examples, the fiber distribution optic cable 62 may be broken out to provide for a plurality of individual optical fiber cables 78. When the modules 80 are mounted, they are placed within openings 76a of the container 72. The individual optical fiber cables 78 may be led out of the container 72 through the openings 76a of the container 72. The first end portions 66 of the optical fiber cables 78 may face upwardly out of the openings 76.

As noted above, a pre-determined length of cabling may be coiled about the fiber optic cable spool 10 prior to connecting the cabling to the telecommunications equipment. It should be noted that customers may order the packaging assembly 60 with different lengths of the fiber optic cabling 78 as needed. For example, embodiments with 100 feet, 200 feet, 300 feet, 500 feet, 600 feet, 800 feet, 900 feet, 1000 feet, 1200 feet, or 1500 feet of the fiber optic cabling 78 may be ordered as desired by the customers. It will be appreciated that the amount of cable length may vary per customer needs. The desired amount of fiber optic cabling 78 may be wound in a factory.

Once the desired amount of fiber optic cabling 78 is wound on the fiber optic cable spool 10, the fiber optic cable spool 10 may be taken to a different location (i.e., equipment area) such that the first end portion 66 of the fiber distribution optic cable 62 that is stored within the storage compartment 24 of the drum 20 may be worked on for attaching telecommunications equipment.

In certain examples, the packaging assembly 60 may include a plurality of telecommunications modules 80 (e.g., telecommunications equipment), although alternative telecommunications equipment is possible. The packaging assembly 60 may be used with virtually any telecommunications equipment where long segments of cabling extending from the equipment needs to be accommodated during transport and deployment. An exemplary packaging assembly and telecommunications module has been described in International Application No. PCT/US2019/020077, which is hereby incorporated by reference in its entirety.

The packaging assembly 60 and the plurality of telecommunications modules 80 may be removably positioned within the storage compartment 24 of the drum 20. In certain examples, the telecommunications packaging assembly 60 may be accessible through the first opening 26 defined by the first radial flange 12.

In certain examples, the packaging assembly 60 may include the plurality of telecommunications modules 80 in a stacked arrangement as shown in FIG. 6. According to the depicted example, the container 72 may include a first (front) container 82 placed adjacent a second (rear) container 84, each configured to hold a plurality of the modules 80. In other embodiments, the container 72 may simply include a divider for keeping the two sets of modules 80 separate.

According to one example embodiment, the packaging assembly 10 may be configured to hold eighteen modules 14 in each container 82, 84, wherein each module 80 may provide twenty-four connection locations in the form of fiber optic adapters 86 at the front end thereof, opposite from a cable entry end 88. In the subject example, the adapters 86 are SC-type adapters, although it will be understood that the scope of the present disclosure is not limited to the use of SC-type adapters and other types of adapters may be used. Similar SC-type adapters have been described in detail in commonly owned U.S. Pat. No. 5,317,663, the disclosure of which is incorporated herein by reference. One example module 80 of the packaging assembly 60 is illustrated in further detail in FIG. 7, as will be discussed below.

With two containers 82, 84 placed in an adjacent relationship, the packaging assembly 60 may include a total of thirty-six modules 80, each terminating twenty-four fibers, for a total of eight hundred sixty-four fibers in a given packaging assembly 60. In certain examples, the multiple optical fibers of the first end portions 66 of the fiber optic cabling 78 would have a connectorized end that may be in connected engagement with the fiber optic adapters 86. It will be understood, however, that the scope of the present disclosure is not limited to the first end portions 66 having connectorized ends since the optical fibers of the first end portions 66 could be spliced to a plurality of pigtails having connectorized ends.

The first end portions 66 of the optical fibers may pass from the storage compartment 24 of the drum 20 where additional cabling may also be stored. The first end portions 66 may be pulled out from the drum 20 to be connectorized. The connectorized ends of the optical fibers located within the storage compartment 24 of the drum 20 may be routed to the adapters 86 of the modules 80 within the packaging assembly 60.

In the depicted example, the containers 82, 84 are illustrated as corrugated cardboard boxes. In other examples, the container(s) 82, 84 may be thermoformed polymeric structures such as clamshell trays. When using thermoformed polymeric containers, a divider may simply be integrally thermoformed to provide two distinct chambers.

As shown, a radius limiter structure 90, may be mounted between the first and second containers 82, 84 for guiding all of the fiber optic cabling 78 extending from the telecommunications modules 80 with minimum bend radius protection. In the depicted embodiment, the radius limiter 90 is a removable structure and is configured such that it can be mounted with a friction fit to a sidewall defined by either of the first or second containers 82, 84 or by a divider defined between the two sets of modules 80.

Cable bundles 92 may be formed by utilizing ties 94 that include hook and loop type fasteners (e.g., Velcro®) although other types of fastening structures may be used for forming different types of cable bundles 92.

Figure 8:
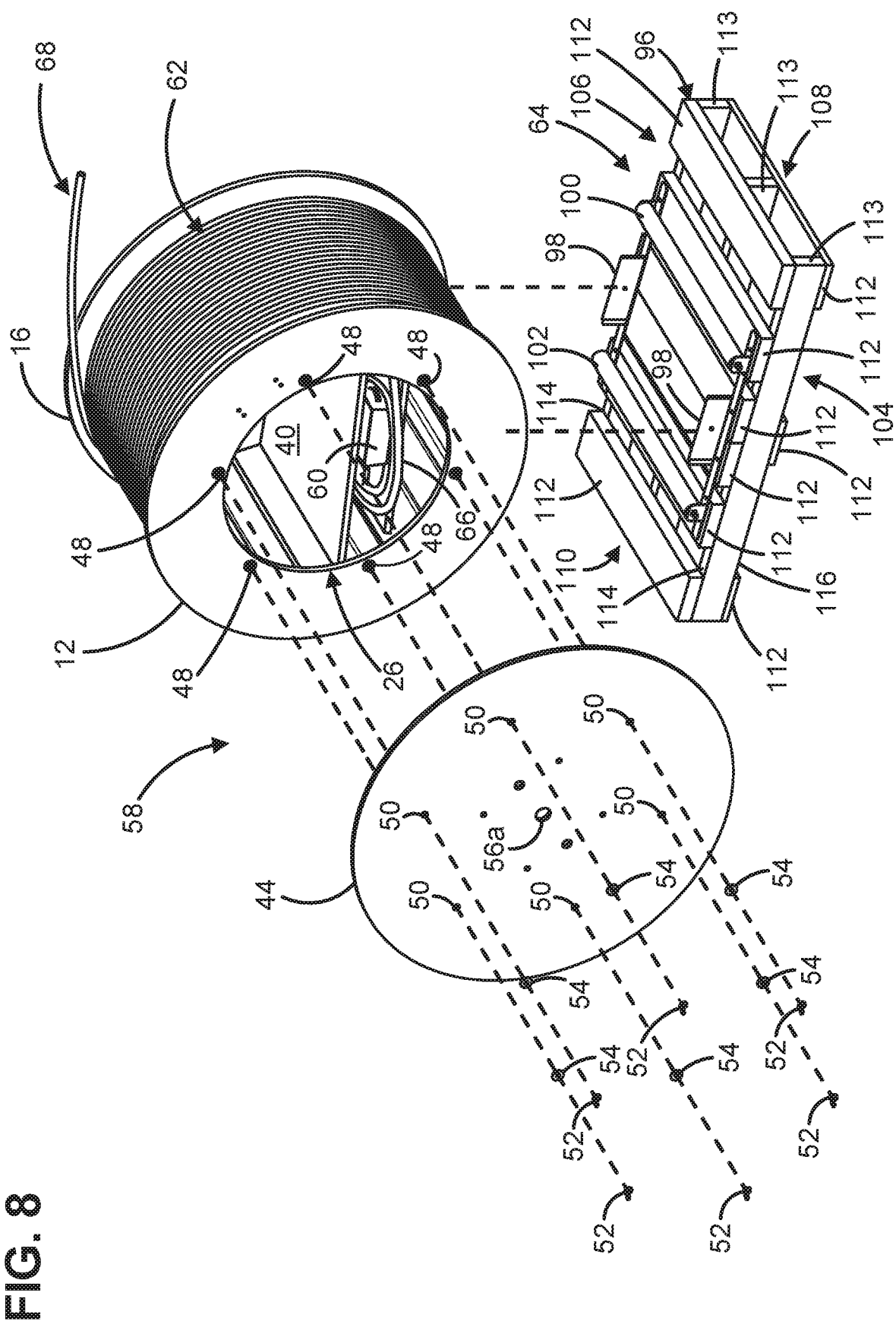
FIG. 8 is a perspective view of the cable spool assembly with the packaging assembly of FIG. 4 mounted within a drum of the cable spool assembly.

Turning to FIG. 8, after the telecommunications equipment has been worked on, the packaging assembly 60 may be placed back into the storage compartment 24 of the drum 20 through the first opening 26 defined by the first radial flange 12. It will be appreciated that a length of the fiber distribution optic cable 62 may be wrapped around an exterior of the packaging assembly 60 and also stored within the storage compartment 24 of the drum 20. The third radial flange 44 may be attached and secured to the first radial flange 12 to close off the first opening 26.

When the packaging assembly 60 has been transported to its mounting location, the packaging assembly 60 may be removed from the storage compartment 24 of the drum 20, mounted to a telecommunications rack or other mounting location and fixed in position.

One example method of paying out the fiber distribution optic cable 62 from the fiber optic cable spool 10 will now be described. The example method accounts for the varying lengths of the fiber distribution optic cable 62 needed. It is understood by a person of skill in the art that other methods for selective payout of the fiber distribution optic cable 62 may be utilized with the present disclosure.

Figure 9:
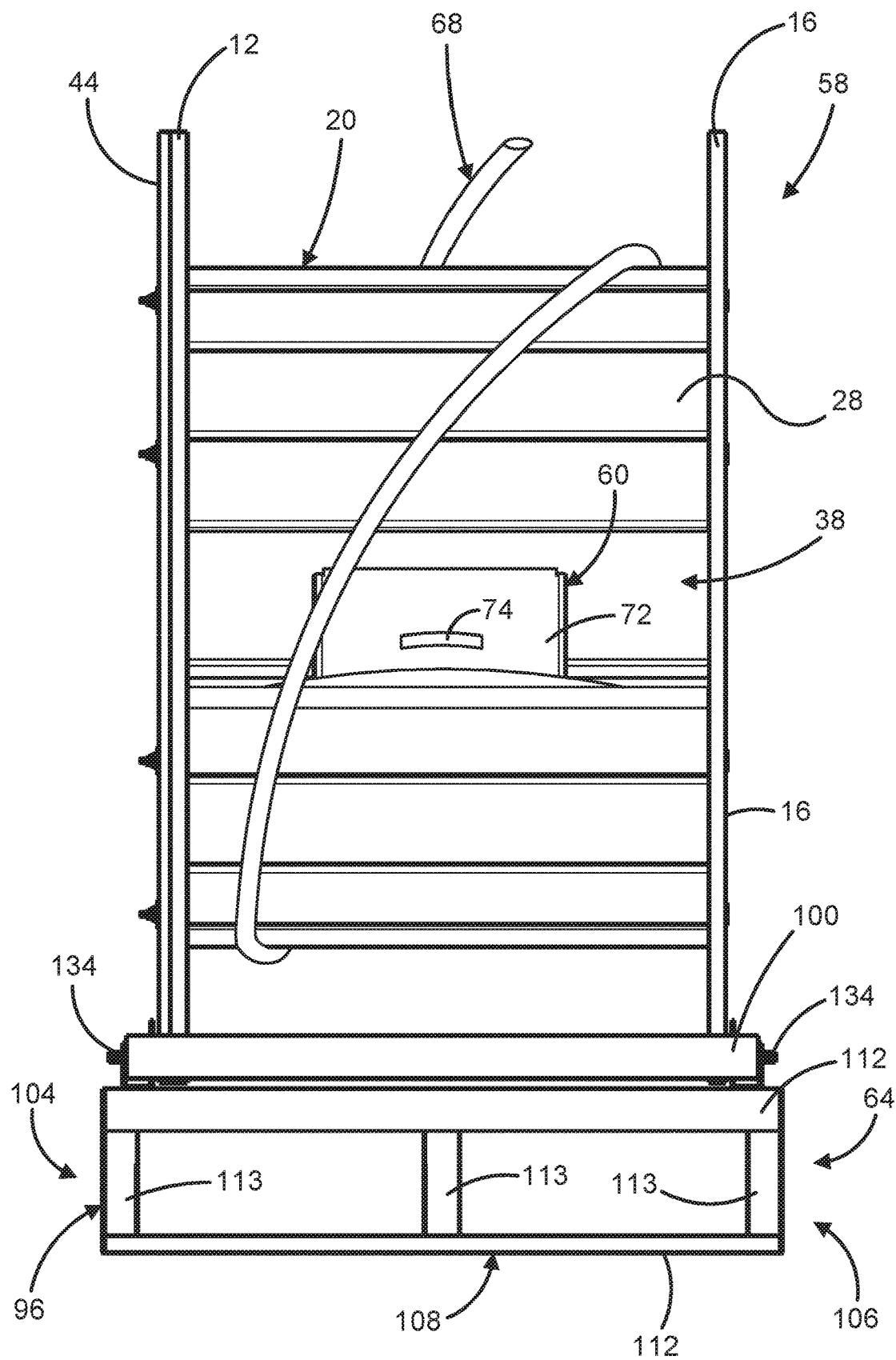
FIG. 9 is an end view of the fiber optic cable spool mounted to the mounting system of FIG. 3 with cabling unwound and showing the second opening.
Figure 10:
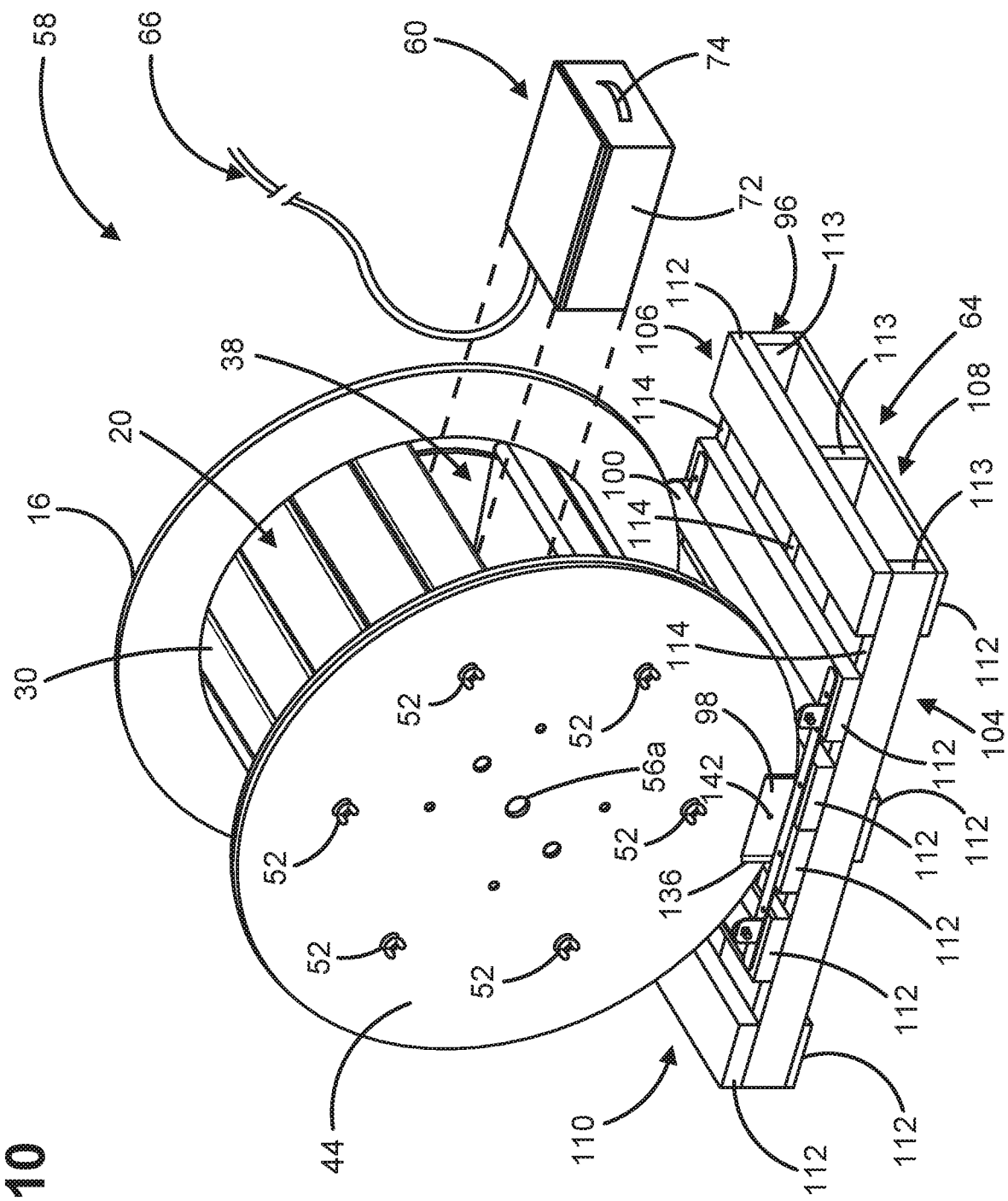
FIG. 10 is a perspective view of the cable spool assembly with the packaging assembly removed from the drum.

Turning to FIGS. 9-10, in some examples, if plastic wrap is on the fiber optic cable spool 10, the plastic wrap is removed before accessing the drum 20. Before the packaging assembly 60 is removed, the fiber distribution optic cable 62 may be unwound from the drum 20 by accessing the second end portion 68 of the fiber distribution optic cable 62. The fiber distribution optic cable 62 may be deployed traversely from the drum 20 of the fiber optic cable spool 10. This will allow ease of deployment. The fiber distribution optic cable 62 may be payable and removable from the drum 20 to expose the second opening 38. That is, the fiber distribution optic cable 62 may be unwound from the fiber optic spool 10 until all of the coiled fiber distribution optic cable 62 is removed. While the fiber distribution optic cable 62 is being paid out, the fiber optic cable spool 10 is configured to rotate. Once the desired length of the fiber distribution optic cable 62 has been paid out, the rotation of the fiber optic cable spool 10 may cease.

The second opening 38 may be exposed once the fiber distribution optic cable 62 is unwound from the drum 20. As such, the packaging assembly 60 may be accessible and removed through the second opening 38 defined by the circumferential drum surface 28 of the drum 20.

In certain examples, the second end portion 68 may be spliced to an incoming cable. That is, the second end portion 68 of the fiber distribution optic cable 62 may be spliced to a telecommunications system. In certain examples, the second end portion 68 may be routed to an optical signal source at which the second end portion 68 is connected to an optical network.

Another aspect of the present disclosure relates to a method of packaging a cable spool.

In certain examples, the method may include the steps of: 1) providing the fiber optic cable spool 10; 2) placing the first end portion 66 of the fiber distribution optic cable 62 within the storage compartment 24 through the second opening 38; and 3) wrapping the second end portion 68 of the fiber distribution optic cable 62 around the circumferential drum surface 28 of the fiber optic cable spool 10 such that the second opening 38 is closed off by the fiber distribution optic cable 62.

The present disclosure may also relate to a method of packaging a cable spool for storage or shipping of telecommunications equipment with connection locations.

In certain examples, the method may include the steps of: 1) providing the fiber optic cable spool 10 with the fiber distribution optic cable 62 coiled about the drum 20 such that the first end portion 66 of the fiber distribution optic cable 62 is placed inside the storage compartment 24 and the second end portion 68 of the fiber distribution optic cable 62 is wrapped around the drum 20 such that the second opening 38 is closed off by the fiber distribution optic cable 62; 2) removing the third radial flange 44 from the fiber optic cable spool 10 to expose the first opening 26; 3) accessing the storage compartment 24 through the first opening 26 to pull out the first end portion 66 of the fiber distribution optic cable 62; 4) attaching the telecommunications equipment to the fiber distribution optic cable 62 at the first end portion 66 thereof; 5) inserting the telecommunications equipment and the first end portion 66 of the fiber distribution optic cable 62 into the storage compartment 24 through the first opening 26 of the first radial flange 12; and 6) mounting the third radial flange 44 back onto the fiber optic cable spool 10 to close off the first opening 26.

The present disclosure further relates to a method of deploying a packaged cable spool assembly with stored telecommunications equipment.

In certain examples, the method includes the steps of: 1) providing the cable spool assembly 58 that includes the fiber optic cable spool 10 and the fiber distribution optic cable 62 coiled about the drum 20 where the telecommunication equipment is attached to the first end portion 66 of the fiber distribution optic cable 62, the telecommunications equipment and the first end portion 66 of the fiber distribution optic cable 62 being stored inside the storage compartment 24, and the second end portion 68 of the fiber distribution optic cable 62 being wrapped around the drum 20 such that the second opening 38 may be closed off by the fiber distribution optic cable 62; 2) mounting the fiber optic cable spool 10 onto the mounting system 64 such that the first and second radial flanges 12, 16 are positioned vertically on the mounting system 64; 3) moving the fiber optic cable spool 10 while mounted on the mounting system 64 to a desired location; 4) grabbing the second end portion 68 of the fiber distribution optic cable 62; 5) unwinding the fiber distribution optic cable 62 from the drum 20 of the fiber optic cable spool 10 to expose the second opening 38; 6) grabbing the telecommunications equipment stored within the storage compartment 24; 7) pulling the telecommunications equipment out of the storage compartment 24 through the second opening 38; and 8) mounting the telecommunications equipment to a telecommunications rack (not shown).

In certain examples, the step of unwinding the fiber distribution optic cable 62 includes allowing the fiber optic cable spool 10 to spin on rotatable rollers while the fiber distribution optic cable 62 is deployed.

Figure 11:
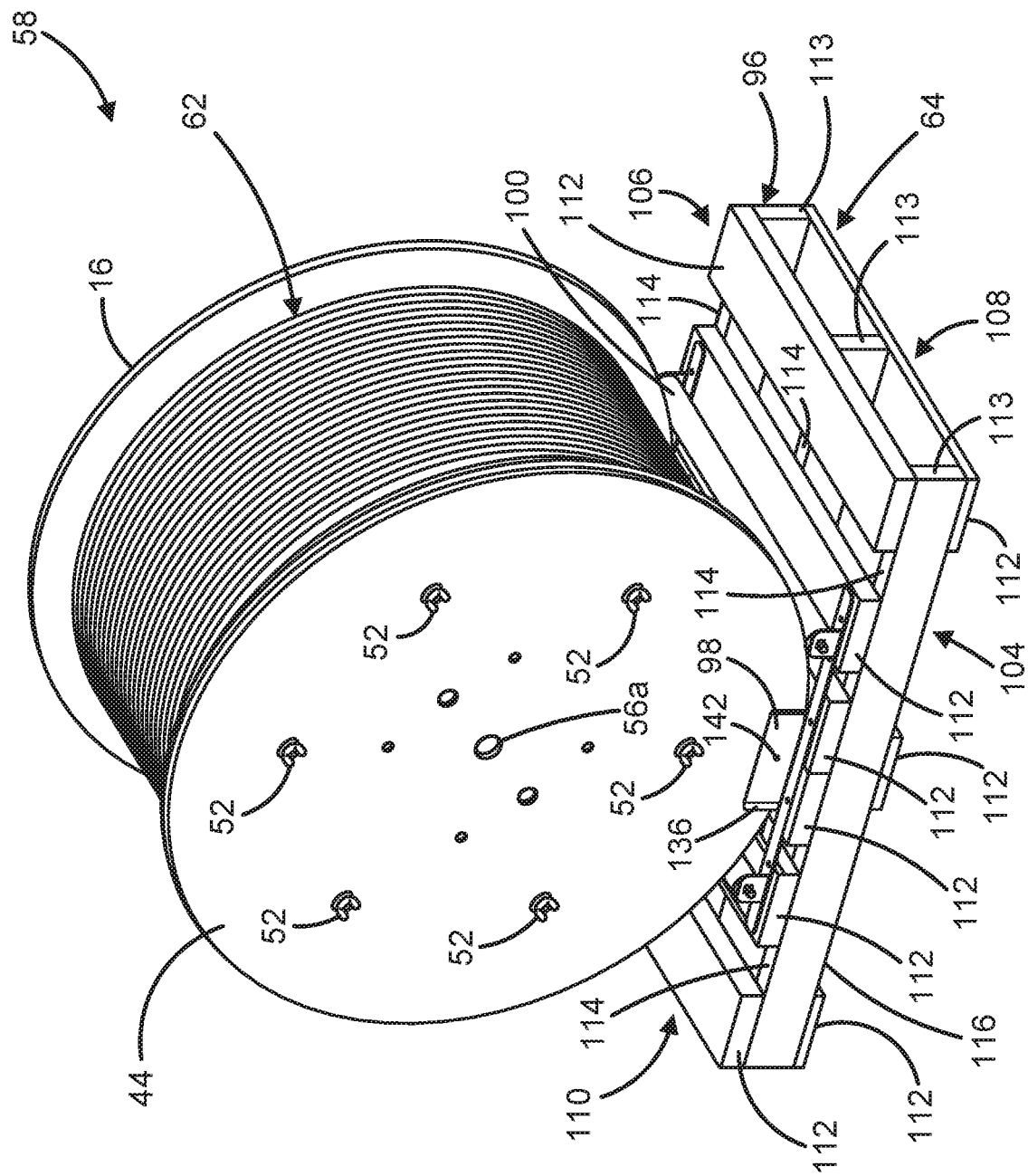
FIGS. 11-13 are multiple perspective views of the cable spool assembly.
Figure 13:
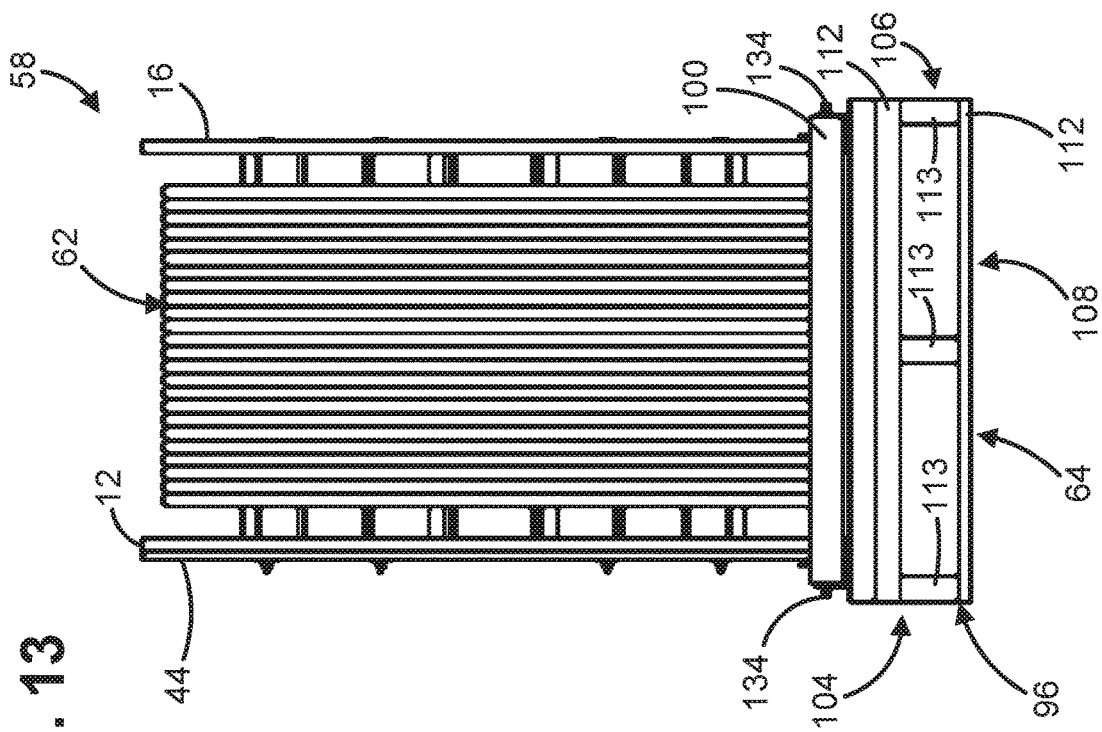
Figure 12:
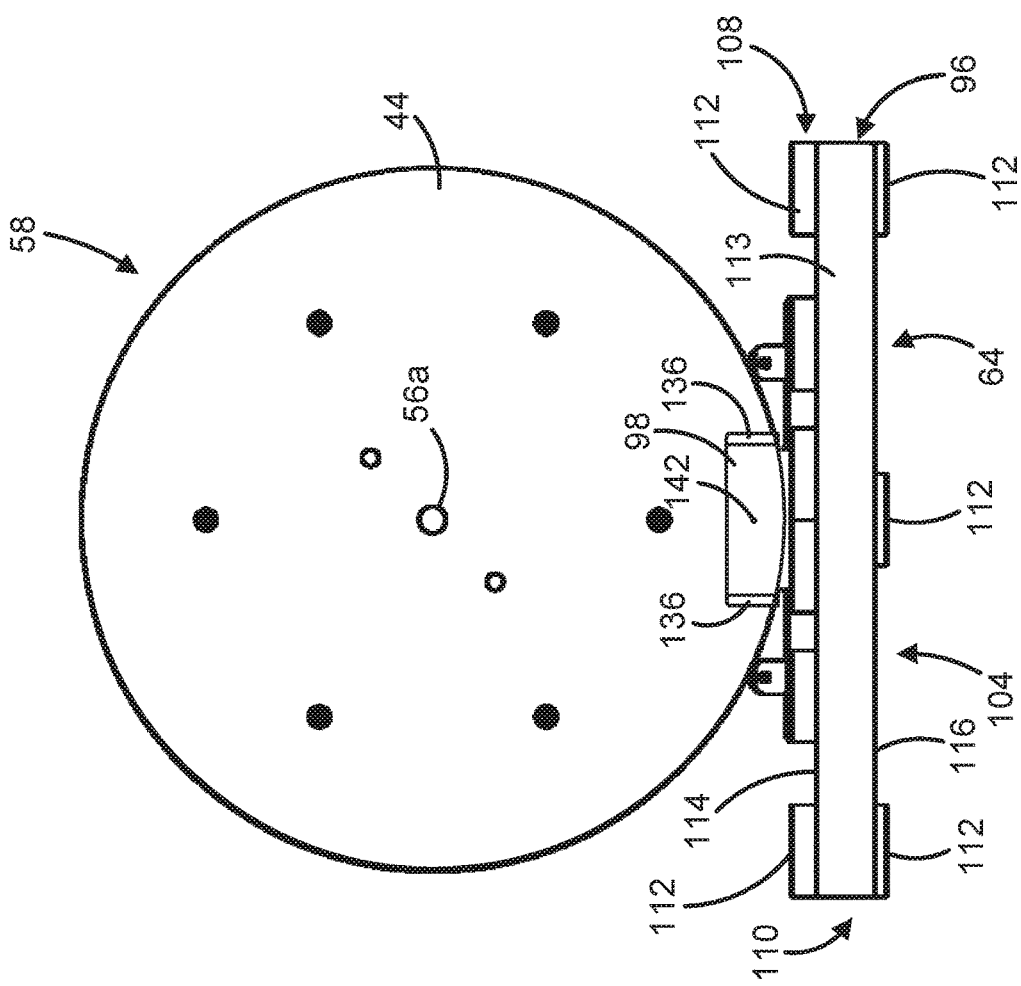

Turning to FIGS. 11-13, another aspect of the present disclosure relates to the mounting system 64 for transporting the fiber optic cable spool 10. In the example shown, the cable spool assembly 58 is depicted with the mounting system 64 arranged and configured to support the fiber optic cable spool 10. That is, the mounting system 64 is shown supporting the first, second, and third radial flanges 12, 16, 44 of the fiber optic cable spool 10.

In one example, the mounting system 64 may include a support member for supporting the fiber optic cable spool. In one example, the support member may include a pallet-like structure 96.

The mounting system 64 may also include mounting brackets 98 and first and second rotatable rollers 100, 102 (e.g., roller type wheels) located on the pallet-like structure 96 for transporting the fiber optic cable spool 10.

In other examples, the fiber optic cable spool 10 may be transported in a wheeled cart (e.g., dolly, 4-wheeled cart, etc.), although alternatives are possible.

The pallet-like structure 96 may be used for handling by a fork lift hoist apparatus or the like. The pallet-like structure 96 may be a wooden pallet, although alternatives are possible. In certain examples, the pallet-like structure 96 may be a metal pallet. In certain examples, the pallet-like structure 96 may be a plastic pallet. In one example, the pallet-like structure 96 may include a size of about 30 inches wide by 45 inches long. The pallet-like structure 96 may be sized to enter doors of central offices and may fit down aisle of the central office building. The pallet-like structure 96 may be moved to any desired location for deployment. That is, restrictions with respect to dimensions of a doorway or aisle are not an issue because the fiber optic cable spool 10 can be handled vertically on the pallet-like structure 96 to allow for any desired radius dimension of spooled cable.

The packaging assembly 60 may be removed through the second opening 38 of the drum 20 because the third radial flange 44 may be hard to take off in order to access and remove the packaging assembly 60 through the first opening 26 while the fiber optic cable spool 10 and pallet-like structure 96 are positioned in a narrow aisle or doorway.

The pallet-like structure 96 can be configured to fit through narrower deployment areas. That is, the pallet-like structure 96 allows for the fiber optic cable spool 10 to have cabling spooled thereabout at any radius while still being able to fit the fiber optic cable spool 10 through narrower openings. In one example, the pallet-like structure 96 allows the fiber optic cable spool 10 to fit through tight door openings, such as openings as narrow as about 34 inches, although alternatives are possible.

Unlike most spools that lay flat on a pallet and have a width of about 42 inches which may be too wide to fit through some deployment areas, the fiber optic cable spool 10 may be adapted to sit upright on the first and second rotatable rollers 100, 102 of the pallet-like structure 96 which allows the fiber optic cable spool 10 to be transported through narrow openings. That is, the width problem can be solved by having the fiber optic cable spool 10 positioned upright on the pallet-like structure 96. As such, the fiber optic cable spool 10 may be coiled with a desired length of cabling and not be limited by its width size.

Figure 14:
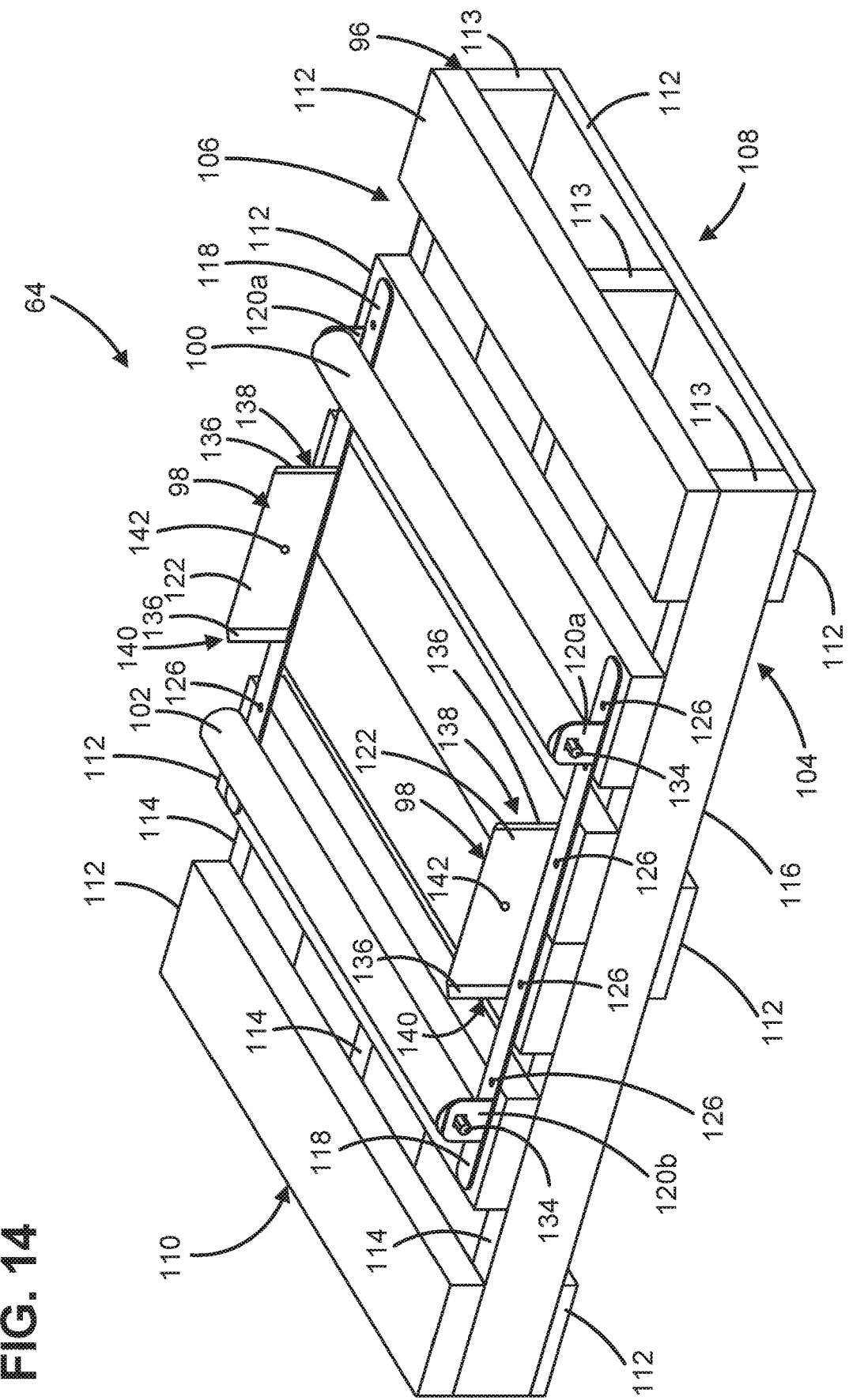
FIGS. 14-15 are multiple views of the mounting system of FIG. 3.
Figure 15:
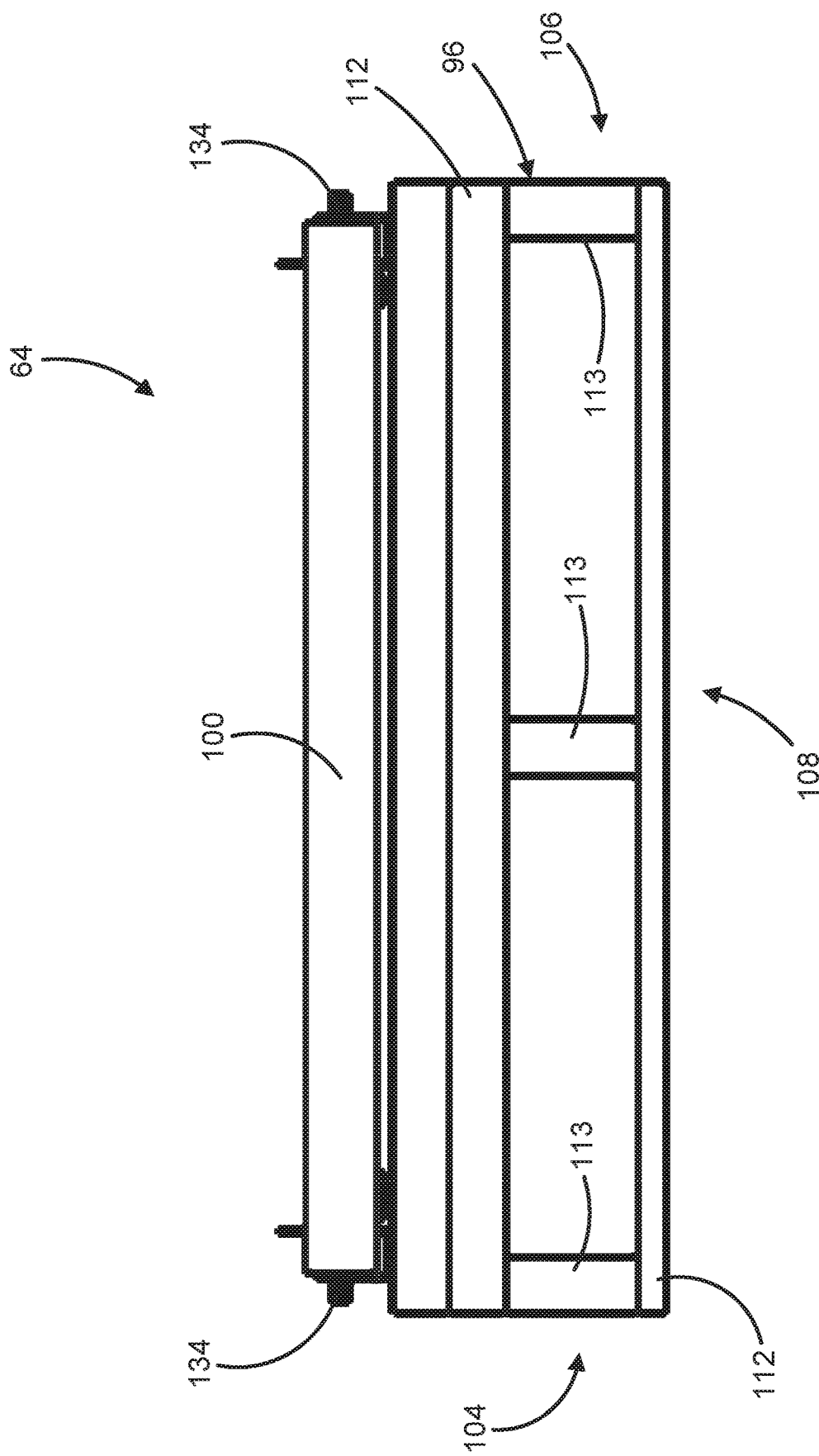
Figure 16:
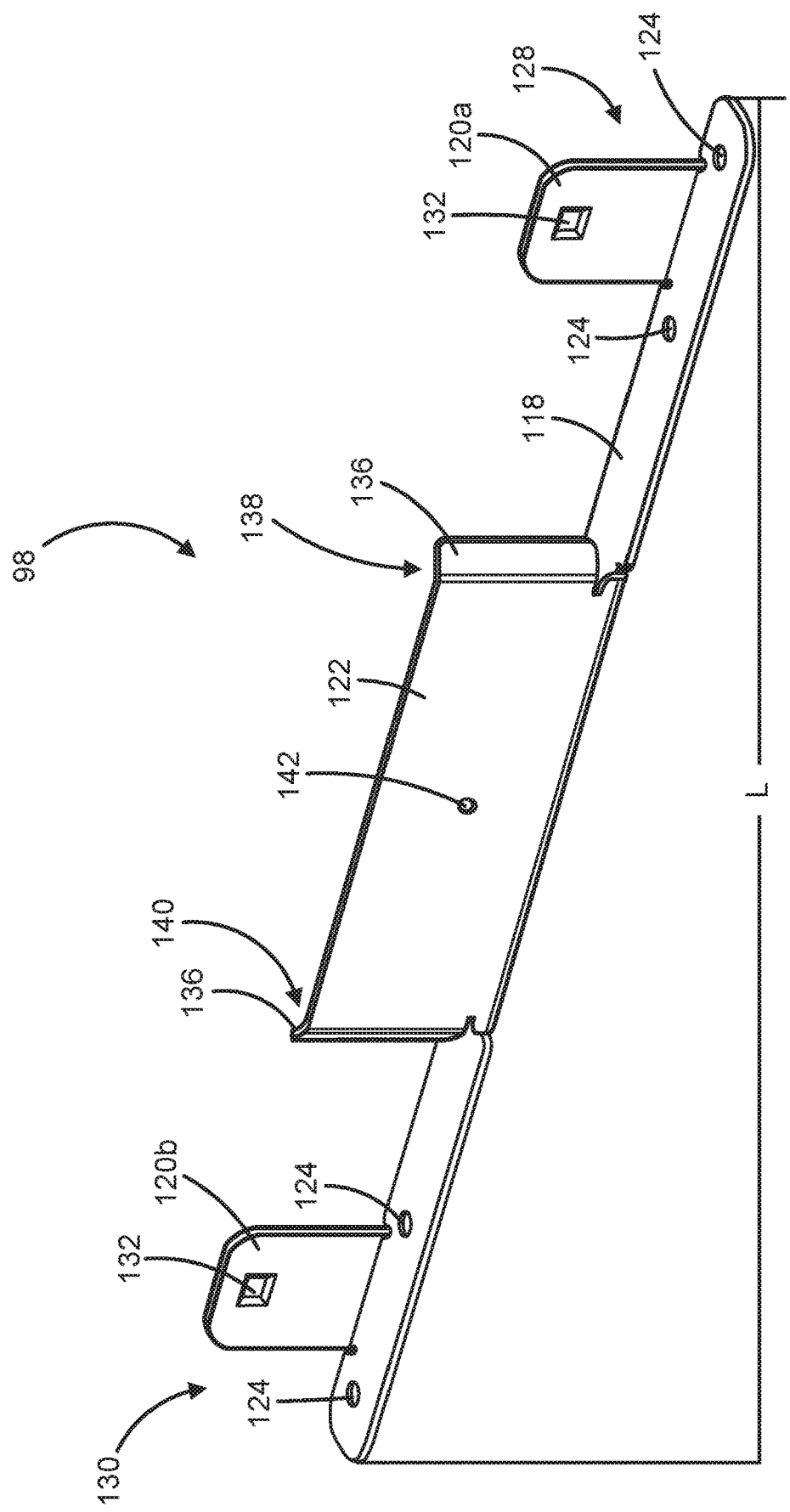
FIG. 16 is a perspective view of an example mounting bracket in accordance with the principles of the present disclosure.

Turning to FIGS. 14-16, the pallet-like structure 96 includes a first major side 104, an opposite, second major side 106 generally parallel to the first major side 104, a first minor side 108, and a second minor side 110 oppositely disposed to the first minor side 108. The first minor side 108 and the second minor side 110 extend generally perpendicularly between the first major side 104 and the second major side 106.

A plurality of beams 112 (e.g., boards) can be positioned across base members 113 of the pallet-like structure 96 on a first surface 114 and an opposite, second surface 116 thereof. The plurality of base members 112 may extend across the pallet-like structure 96 between the first and second major sides 104, 106.

The first and second rotatable rollers 100, 102 may be mounted to the pallet-like structure 96 as stationary rollers. The first and second rotatable rollers 100, 102 allows the fiber optic cable spool 10 to spin for deployment. The first and second rotatable rollers 100, 102 may be positioned on the pallet-like structure 96 to support the first, second, and third radial flanges 12, 16, 44 in an upright position. That is, the first, second, and third radial flanges 12, 16, 44 may be supported on the first and second rotatable rollers 100, 102 at ninety degrees relative to the pallet-like structure 96. The fiber optic cable spool 10 may rotate about the central spool axis A when the fiber distribution optic cable 62 is dispensed from the drum 20 of the fiber optic cable spool 10. The central spool axis A may be horizontally aligned when the fiber optic cable spool 10 is mounted to the pallet-like structure 96.

In certain examples, the first and second rotatable rollers 100, 102 may be spaced apart on the pallet-like structure 96. The mounting bracketing 98 may be positioned on opposite sides of the pallet-like structure 96 to allow the first and second rotatable rollers 100, 102 to extend across the pallet-like structure 96 between the first and second major sides 104, 106. That is, the mounting brackets 98 may be attached to the first surface 114 of the pallet-like structure 96 at the first and second major sides 104, 106 and have a length L that extends across the plurality of base members 112 along or parallel to the first and second major sides 104, 106, although alternatives are possible.

In certain examples, there may be a plurality of rollers spaced and positioned on the pallet-like structure 96 to allow the fiber optic cable spool 10 to spin. Although two mounting brackets 98 are shown, the pallet-like structure 96 may be configured with more brackets.

The mounting brackets 98 may each include a plate member 118, at least two upright members 120 and a guide member 122. The plate member 118, upright members 120, and the guide member 122 may be integrally formed (e.g., formed of one piece), although alternatives are possible. In certain examples, the upright members 120 and the guide member 122 may be coupled to the plate member 118. The mounting brackets 98 define openings 124 (e.g., holes, apertures) in the plate member 118 for receiving fasteners 126 (e.g., bolts, screws, rivets, etc.) that extend therethrough to fix the mounting brackets 98 to the pallet-like structure 96.

In certain examples, the mounting brackets 98 may each include a first upright member 120a located at a first end 128 thereof and a second upright member 120b located at a second end 130 thereof. The first and second upright members 120a, 120b may extend upwardly from the plate member 118 such that the first and second upright members 120a, 120b are generally perpendicular to the plate member 118.

The first and second upright members 120a, 120b of each mounting bracket 98 may define an aperture 132 for receiving a shaft 134 (e.g., rod) of the first and second rotatable rollers 100, 102, respectively. The shaft 134 can extend through the aperture 132 of the first and second upright members 120a, 120b to allow the first and second rotatable rollers 100, 102 to rotate. Thus, when the radial spools 12, 16, 44 of the fiber optic cable spool 10 are positioned on the first and second rotatable rollers 100, 102, the fiber optic cable spool 10 can rotate about the central spool axis A and the cabling can be easily unwound or deployed traversely.

The guide member 122 of the mounting bracket 98 may include angled walls 136 at opposing ends 138, 140 of the guide member 122. The angled walls 136 may have an angle of about 45 degrees, although alternatives are possible. The angled walls 136 of the mounting bracket 98 may be configured to help guide the fiber optic cable spool 10 while the fiber optic cable spool 10 spins on the rotatable rollers 100, 102. That is, the angled walls 136 may allow the fiber optic cable spool 10 to spin without getting hung up.

The guide member 122 of each mounting bracket 98 may also have a hole 142 centrally located therein. Although one hole is depicted, it will be appreciated that more than one hole may be defined in the guide member 122. The hole 142 may be tapped in the guide member 122 to receive a fastener (e.g., bolt, screw, rivet etc.) for locking the fiber optic cable spool 10 in place. The fastener may be threaded through the hole 142 of the guide member 122 and into a hole defined in the radial flanges of the fiber optic cable spool 10 to prevent the fiber optic cable spool 10 from spinning. The fasteners may be removed when it is desired to have the fiber optic cable spool 10 spin on the pallet-like structure 96.

In some examples, the fiber optic cable spool 10 or portions thereof may be surrounded with plastic wrap. The plastic wrap may further protect and insulate the cabling and telecommunications equipment within the storage compartment 24. The plastic wrap also may help to maintain the fiber distribution optic cable 62 within the drum 20. In some embodiments, the plastic wrap is removed or unwrapped prior to use (e.g., deployment or pay out) of the fiber distribution optic cable 62.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A fiber optic cable spool comprising:
    a first radial flange located at a first axial end of the fiber optic cable spool;
    a second radial flange located at a second axial end of the fiber optic cable spool;
    a drum that extends axially between the first and second radial flanges, the drum having a circumferential drum surface; and
    a storage compartment located within the drum, the first radial flange defining a first opening for accessing the storage compartment within the drum;
    wherein the circumferential drum surface of the drum defines a second opening for accessing the storage compartment within the drum, wherein the storage compartment is configured such that a telecommunications package including at least one telecommunications module is adapted to be removably positioned in the storage compartment, and wherein the fiber optic cable spool is configured such that the first and second openings are sized to allow the telecommunications package including the at least one telecommunications module to be accessible and removable through the first opening defined by the first radial flange and to be accessible and removable through the second opening defined by the circumferential drum surface of the drum.

2. The fiber optic cable spool of claim 1, wherein the first opening is closed off by a lid.

3. The fiber optic cable spool of claim 2, wherein the lid is a third radial flange, the third radial flange being secured to and axially overlapping the first radial flange.

4. The fiber optic cable spool of claim 1, wherein a fiber distribution optic cable is adapted to be arranged in a coil around the circumferential drum surface of the drum and contained between the first and second radial flanges.

5. The fiber optic cable spool of claim 1, wherein when a fiber distribution optic cable is coiled about the drum, the fiber distribution optic cable closes off the second opening.

6. A cable spool assembly for packaging a telecommunications assembly for storage or shipment, the cable spool assembly comprising:
    a first radial flange that defines a first axial end;
    an opposite, second radial flange that defines a second axial end;
    a drum that extends axially between the first and second radial flanges, the drum having a circumferential drum surface, the first and second radial flanges each defining an outer annular rim that projects radially outwardly from the drum;
    a storage compartment located within the drum, the storage compartment being accessible through a first access opening defined by at least the first radial flange, the circumferential drum surface of the drum defining a second access opening for accessing the storage compartment within the drum;
    a packaging assembly for holding a plurality of telecommunications modules being removably positioned within the storage compartment;
    a fiber distribution optic cable coiled about the circumferential drum surface and contained axially between the first and second radial flanges, the fiber distribution optic cable being payable and removable from the drum, the fiber distribution optic cable having an end that is secured to the packaging assembly; and
    a mounting system for supporting the first and second radial flanges, the mounting system including a support member and first and second rotatable rollers located on the support member, the first and second rotatable rollers being positioned to support the first and second radial flanges at ninety degrees relative to the support member, wherein the cable spool assembly rotates about a central spool axis when the fiber distribution optic cable is dispensed from the cable spool assembly, the central spool axis being horizontally aligned, wherein the cable spool assembly is configured such that the first and second access openings are sized to allow the packaging assembly holding the plurality of telecommunications modules to be accessible and removable through the first access opening defined by at least the first radial flange and to be accessible and removable through the second access opening defined by the circumferential drum surface of the drum.

7. The cable spool assembly of claim 6, wherein the first access opening is closed off by a lid.

8. The cable spool assembly of claim 7, wherein the lid is a third radial flange, the third radial flange being secured to and axially overlapping the first radial flange.

9. The cable spool assembly of claim 6, wherein the fiber distribution optic cable closes off the second access opening.

10. The cable spool assembly of claim 6, wherein the first and second rotatable rollers are mounted to the support member via a mechanical mounting feature.

11. A cable spool assembly for packaging a telecommunications assembly for storage or shipment, the cable spool assembly comprising:

a first radial flange that defines a first axial end;
an opposite, second radial flange that defines a second axial end;
a drum that extends axially between the first and second radial flanges, the drum having a circumferential drum surface, the first and second radial flanges each defining an outer annular rim that projects radially outwardly from the drum;
a storage compartment located within the drum, the storage compartment being accessible through a first access opening defined by at least the first radial flange, the circumferential drum surface of the drum defining a second access opening for accessing the storage compartment within the drum;
a packaging assembly for holding a plurality of telecommunications modules being removably positioned within the storage compartment;
a fiber distribution optic cable coiled about the circumferential drum surface and contained axially between the first and second radial flanges, the fiber distribution optic cable being payable and removable from the drum, the fiber distribution optic cable having an end that is secured to the packaging assembly; and
a mounting system for supporting the first and second radial flanges, the mounting system including a support member, wherein the cable spool assembly rotates about a central spool axis when the fiber distribution optic cable is dispensed from the cable spool assembly, the central spool axis being horizontally aligned, wherein the cable spool assembly is configured such that the first and second access openings are sized to allow the packaging assembly holding the plurality of telecommunications modules to be accessible and removable through the first access opening defined by at least the first radial flange and to be accessible and removable through the second access opening defined by the circumferential drum surface of the drum.

12. The cable spool assembly of claim 11, wherein the first access opening is closed off by a lid.

13. The cable spool assembly of claim 12, wherein the lid is a third radial flange, the third radial flange being secured to and axially overlapping the first radial flange.

14. The cable spool assembly of claim 11, wherein the fiber distribution optic cable closes off the second access opening.

15. The cable spool assembly of claim 11, wherein the support member includes a pallet.

16. The cable spool assembly of claim 11, further comprising first and second rotatable rollers located on the support member, the first and second rotatable rollers being positioned to support the first and second radial flanges at ninety degrees relative to the support member.

* * * * *